United States Patent
Katsavounidis et al.

(10) Patent No.: US 11,153,585 B2
(45) Date of Patent: *Oct. 19, 2021

(54) OPTIMIZING ENCODING OPERATIONS WHEN GENERATING ENCODED VERSIONS OF A MEDIA TITLE

(71) Applicant: NETFLIX, INC., Los Gatos, CA (US)

(72) Inventors: Ioannis Katsavounidis, San Jose, CA (US); Anne Aaron, Menlo Park, CA (US); Jan De Cock, Cupertino, CA (US)

(73) Assignee: NETFLIX, INC., Los Gatos, CA (US)

( * ) Notice: Subject to any disclaimer, the term of this patent is extended or adjusted under 35 U.S.C. 154(b) by 71 days.

This patent is subject to a terminal disclaimer.

(21) Appl. No.: 16/054,621

(22) Filed: Aug. 3, 2018

(65) Prior Publication Data

US 2018/0343458 A1 Nov. 29, 2018

Related U.S. Application Data

(63) Continuation-in-part of application No. 15/902,976, filed on Feb. 22, 2018.

(Continued)

(51) Int. Cl.
*H04N 19/42* (2014.01)
*H04N 19/179* (2014.01)
(Continued)

(52) U.S. Cl.
CPC .......... *H04N 19/42* (2014.11); *H04N 19/103* (2014.11); *H04N 19/142* (2014.11);
(Continued)

(58) Field of Classification Search
CPC .... H04N 19/42; H04N 19/179; H04N 19/177; H04N 19/154; H04N 19/142
(Continued)

(56) References Cited

U.S. PATENT DOCUMENTS

| 5,612,742 A | 3/1997 | Krause et al. |
| 7,394,410 B1 | 7/2008 | Wegener |

(Continued)

FOREIGN PATENT DOCUMENTS

| CN | 1393109 A | 1/2003 |
| CN | 1778117 A | 5/2006 |

(Continued)

OTHER PUBLICATIONS

International Search Report for application No. PCT/US2018/042338 dated Oct. 29, 2018.

(Continued)

*Primary Examiner* — On S Mung
(74) *Attorney, Agent, or Firm* — Artegis Law Group, LLP

(57) ABSTRACT

In various embodiments, a sequence-based encoding application partitions a set of shot sequences associated with a media title into multiple clusters based on at least one feature that characterizes media content and/or encoded media content associated with the media title. The clusters include at least a first cluster and a second cluster. The sequence-based encoding application encodes a first shot sequence using a first operating point to generate a first encoded shot sequence. The first shot sequence and the first operating point are associated with the first cluster. By contrast, the sequence-based encoding application encodes a second shot sequence using a second operating point to generate a second encoded shot sequence. The second shot sequence and the second operating point are associated with the second cluster. Subsequently, the sequence-based encoding application generates an encoded media sequence based on the first encoded shot sequence and the second encoded shot sequence.

20 Claims, 15 Drawing Sheets

Related U.S. Application Data

(60) Provisional application No. 62/462,873, filed on Feb. 23, 2017, provisional application No. 62/534,170, filed on Jul. 18, 2017, provisional application No. 62/550,517, filed on Aug. 25, 2017.

(51) Int. Cl.
*H04N 19/177* (2014.01)
*H04N 19/142* (2014.01)
*H04N 19/103* (2014.01)
*H04N 19/154* (2014.01)
*H04N 19/146* (2014.01)
*H04N 19/147* (2014.01)

(52) U.S. Cl.
CPC ......... *H04N 19/177* (2014.11); *H04N 19/179* (2014.11); *H04N 19/146* (2014.11); *H04N 19/147* (2014.11); *H04N 19/154* (2014.11)

(58) Field of Classification Search
USPC .................................................. 375/240.02
See application file for complete search history.

(56) References Cited

U.S. PATENT DOCUMENTS

| | | |
|---|---|---|
| 8,837,601 B2 | 9/2014 | Ronca et al. |
| 8,982,942 B2 | 3/2015 | Gao et al. |
| 9,036,712 B1 | 5/2015 | Cote et al. |
| 9,398,301 B2 | 7/2016 | Ronca et al. |
| 9,584,700 B2 | 2/2017 | Morovic et al. |
| 10,074,382 B2 | 9/2018 | Hoerich et al. |
| 10,666,992 B2 | 5/2020 | Katsavounidis |
| 10,742,708 B2 | 8/2020 | Katsavounidis et al. |
| 2002/0116715 A1 | 8/2002 | Apostolopoulos |
| 2004/0161158 A1 | 8/2004 | Kondo et al. |
| 2005/0031219 A1 | 2/2005 | Puri et al. |
| 2005/0111824 A1* | 5/2005 | Hunter ............... G11B 27/34 386/240 |
| 2007/0047639 A1 | 3/2007 | Ye |
| 2007/0064793 A1 | 3/2007 | Wang et al. |
| 2008/0043332 A1 | 2/2008 | Barkley et al. |
| 2008/0232466 A1 | 9/2008 | Faerber et al. |
| 2009/0295905 A1 | 12/2009 | Civanlar et al. |
| 2010/0202671 A1 | 8/2010 | Chen et al. |
| 2010/0189183 A1 | 9/2010 | Gu et al. |
| 2010/0290520 A1 | 11/2010 | Kamisli et al. |
| 2011/0052087 A1 | 3/2011 | Mukherjee |
| 2011/0069939 A1 | 3/2011 | Choi et al. |
| 2011/0075734 A1 | 3/2011 | Sakazume |
| 2011/0090949 A1 | 4/2011 | Gu |
| 2011/0286525 A1 | 11/2011 | Kamisli et al. |
| 2012/0147958 A1 | 6/2012 | Ronca et al. |
| 2012/0195369 A1 | 8/2012 | Guerrero |
| 2012/0330632 A1 | 12/2012 | Oganov et al. |
| 2013/0051768 A1 | 2/2013 | Soroushian et al. |
| 2013/0089154 A1 | 4/2013 | Chen et al. |
| 2013/0329781 A1 | 12/2013 | Su et al. |
| 2014/0040498 A1 | 2/2014 | Oyman et al. |
| 2014/0201324 A1 | 7/2014 | Zhang et al. |
| 2014/0241418 A1 | 8/2014 | Garbas et al. |
| 2014/0294362 A1 | 10/2014 | Pettersson et al. |
| 2015/0071346 A1 | 3/2015 | Ronca et al. |
| 2015/0127337 A1 | 5/2015 | Heigold et al. |
| 2015/0370796 A1* | 12/2015 | Abramson ............... G06F 16/48 707/726 |
| 2016/0212433 A1 | 7/2016 | Zhu et al. |
| 2016/0379057 A1 | 12/2016 | Katsavounidis |
| 2017/0078686 A1 | 3/2017 | Coward et al. |
| 2017/0186147 A1 | 6/2017 | He et al. |
| 2018/0007355 A1 | 1/2018 | Borel et al. |
| 2018/0041788 A1 | 2/2018 | Wang et al. |
| 2018/0063549 A1 | 3/2018 | Amer et al. |
| 2018/0160161 A1 | 6/2018 | Reznik et al. |
| 2018/0240502 A1 | 8/2018 | Katsavounidis |
| 2018/0241795 A1 | 8/2018 | Katsavounidis |
| 2018/0242002 A1 | 8/2018 | Katsavounidis |
| 2018/0242015 A1 | 8/2018 | Katsavounidis |
| 2018/0302456 A1 | 10/2018 | Katsavounidis et al. |
| 2018/0343458 A1 | 11/2018 | Katsavounidis et al. |
| 2019/0028529 A1 | 1/2019 | Katsavounidis |
| 2019/0028745 A1 | 1/2019 | Katsavounidis |

FOREIGN PATENT DOCUMENTS

| | | |
|---|---|---|
| CN | 102668495 A | 9/2012 |
| CN | 102833538 A | 12/2012 |
| CN | 103501445 A | 1/2014 |
| CN | 103501446 A | 1/2014 |
| CN | 103918009 A | 7/2014 |
| CN | 103999090 A | 8/2014 |
| CN | 104185024 A | 12/2014 |
| CN | 104346613 A | 2/2015 |
| CN | 104737149 A | 6/2015 |
| CN | 104767999 A | 7/2015 |
| CN | 105868700 A | 8/2016 |
| CN | 106537923 A | 3/2017 |
| EP | 2 410 749 A1 | 1/2012 |
| JP | 2005-260576 A | 9/2005 |
| WO | 32/32141 A2 | 4/2002 |

OTHER PUBLICATIONS

Non-Final Office Action received for U.S. Appl. No. 15/902,970 dated Apr. 5, 2019, 59 pages.
Final Office Action received for U.S. Appl. No. 15/902,970 dated Oct. 31, 2019, 41 pages.
Non-Final Office Action received for U.S. Appl. No. 15/902,971 dated Oct. 31, 2019, 50 pages.
Non-Final Office Action received for U.S. Appl. No. 15/902,975 dated Aug. 22, 2019, 34 pages.
Non-Final Office Action received for U.S. Appl. No. 16/016,432 dated Sep. 13, 2019, 46 pages.
Non-Final Office Action received for U.S. Appl. No. 16/053,754 dated Aug. 21, 2019, 27 pages.
Non-Final Office Action received for U.S. Appl. No. 16/034,303 dated Jul. 10, 2019, 27 pages.
T. Wiegand, G. J. Sullivan, G. Bjontegaard, and A. Luthra, "Overview of the H.264/AVC Video Coding Standard," Circuits and Systems for Video Technology, IEEE Transactions on, vol. 13, No. 7, Jul. 2003, pp. 560-576, 2003.
L. Zhao, I. Katsavounidis, and C.-C. J. Kuo, "Another example of software replacing hardware: Real-time software MPEG-2 SDI/HD encoding for digital TV broadcasting," in NAB Broadcast Engineering Conference, 2003, pp. 37-40.
"The Netflix tech blog: High quality video encoding at scale," link: http://techblog.netflix.com/2015/12/high-quality-video-encoding-at-scale.html.
A. Ortega and K. Ramchandran, "Rate-distortion methods for image and video compression: An overview," IEEE Signal Processing Magazine, vol. 15, No. 6, pp. 23-50, 1998.
I. E.Richardson, H. 264 and MPEG-4 video compression: video coding for next-generation multimedia. John Wiley & Sons, 2004.
R. G. Keys, "Cubic convolution interpolation for digital image processing," IEEE Trans. on Acoustics, Speech, and Signal Processing, vol. ASSP-29, No. 6, pp. 1153-1160, 1981.
"Lanczos resampling," link: http://en.wikipedia.org/wiki/Lanczos resampling.
"The Netflix tech blog: Per-Title Encode Optimization," link: http://techblog.netflix.com/2015/12/per-title-encode-optimization.html.
I. Katsavounidis, A. Aaron, and D. Ronca, "Native resolution detection of video sequences," in SMPTE 2015 Annual Technical Conference and Exhibition. SMPTE, 2015, pp. 1-20.
"The Netflix tech blog: Toward a practical perceptual video quality metric," link: http://techblog.netflix.com/2016/06/toward-practical-perceptual-video.html.
"x264," link: https://en.wikipedia.org/wiki/X264, Mar. 2016.
S. Tavakoli, K. Brunnstrom, J. Gutierrez, and N. Garcia, "Quality of experience of adaptive video streaming: Investigation in service

(56) References Cited

OTHER PUBLICATIONS parameters and subjective quality assessment methodology," Signal Processing: Image Communication, vol. 39, pp. 432-443, 2015.
"Consumer Digital Video Library—El Fuente," link: http://www.cdvl.org/documents/EIFuente_summary.pdf.
G. J. Sullivan and T. Wiegand, "Rate-distortion optimization for video compression," IEEE signal processing magazine, vol. 15, No. 6, pp. 74-90, 1998.
T. Thiede, W. C. Treumiet, R. Bitto, C. Schmidmer, T. Sporer, J. G. Beerends, and C. Colomes, "Peaq-the ITU standard for objective measurement of perceived audio quality," Journal of the Audio Engineering Society, vol. 48, No. 112, pp. 3-29, 2000.
"Consumer Digital Video Library," link: http://www.cdvl.org.
International Search Report for application No. PCT/US2018/019575 dated Apr. 9, 2018.
International Search Report for application No. PCT/US2018/019576 dated May 4, 2018.
Westerink et al., "An Optimal Bit Allocation Algorithm for Sub-Band Coding", ICASSP-88., International Conference on Acoustics, Speech, and Signal Processing, Apr. 11-14, 1988, pp. 757-760.
Riskin, Eve A., "Optimal Bit Allocation via the Generalized BFOS Algorithm", IEEE Transactions on Information Theory, Mar. 1, 1991, vol. 37, No. 2, pp. 400-402.
Yu et al., "Efficient Rate Control for JPEG-2000", IEEE Transactions on Circuits and Systems for Video Technology, May 1, 2006, vol. 16, No. 5, pp. 577-589.
Wu et al., "Rate-Constrained Picture-Adaptive Quantization for JPEG Baseline Coders", IEEE International Conference on Acoustics, Speech, and Signal Processing, Apr. 27-30, 1993, pp. 389-392.
Sermadevi et al., "Efficient Bit Allocation for Dependent Video Coding", DCC '04 Proceedings of the Conference on Data Compression, Mar. 23, 2004, 6 pages.
Ramchandran et al., "Bit Allocation for Dependent Quantization with Applications to Multiresolution and MPEG Video Coders", IEEE Transactions on Image Processing, Sep. 1994, vol. 3, No. 5, pp. 533-545.
Ortega et al., "Rate-Distortion Methods for Image and Video Compression", IEEE Signal Processing Magazine, Nov. 1998, vol. 15, No. 6, pp. 23-50.
Non-Final Office Action received for U.S. Appl. No. 15/902,976 dated Jan. 2, 2020, 36 pages.
Notice of Allowance received for U.S. Appl. No. 16/034,303 dated Jan. 14, 2020, 24 pages.
Advisory Action received for U.S. Appl. No. 15/902,970 dated Feb. 10, 2020, 13 pages.
Final Office Action received for U.S. Appl. No. 15/902,971 dated Feb. 20, 2020, 50 pages.
Final Office Action received for U.S. Appl. No. 16/053,754 dated Mar. 18, 2020, 26 pages.
Notice of Allowance received for U.S. Appl. No. 15/902,975 dated Mar. 4, 2020, 28 pages.
Non-Final Office Action received for U.S. Appl. No. 15/902,970 dated Mar. 30, 2020, 51 pages.
Notice of Allowance received for U.S. Appl. No. 16/016,432 dated Apr. 1, 2020, 30 pages.
International Search Report for application No. PCT/US2020/046017 dated Oct. 12, 2020.
Tan et al., "Video Quality Evaluation Methodology and Verification Testing of HEVC Compression Performance", IEEE Transactions on Circuits and Systems for Video Technology, XP011592174, DOI: 10.1109/TCSVT.2015.2477916, vol. 26, No. 1, Jan. 1, 2016, pp. 76-90.
Hanhart et al., "Calculation of average coding efficiency based on subjective quality scores", Journal of Visual Communication and Image Representation, Academic Press, XP028661468, http://dx.doi.org/10.1016/j.vcir.2013.11.008, vol. 25, No. 3, Dec. 4, 2013, pp. 555-564.
Non-Final Office Action received for U.S. Appl. No. 15/902,971, dated Jul. 2, 2020, 36 pages.

Advanced video coding for generic audiovisual services, I T U-T Rec. H.264 and ISO/IEC 14496-10 (AVG), 2003, 282 pages.
"High effciency video coding", I T U-T Rec. H.265 and ISO/IEC 23008-2 (HEVC), 2013, 317 pages.
Grange et al., "VP9 Bitstream & Decoding Process Specification", Version 0.6, Retrieved from https://storage.googleapis.com/downloads.webmprojecl.org/docs/vp9/vp9-bilslieam-specification-v0.6-20160331-draft.pdf, 2016, 171 pages.
Suehring, Karsten, "H.264/AVC software", http://iphome.hhi.de/suehring/tml/, retrieved May 17, 2020, 1 page.
"High Efficiency Video Coding (HEVC) I JCT-VG", Fraunhofer Heinrich Hertz Institute, hllps://hevc.hhi.fraunhofer.de, retrieved Apr. 17, 2020, 2 pages.
webproject / libvpx, hllps://github.com/webmprojecl/libvpx, retrieved Apr. 17, 2020, 5 pages.
Bjontegaard, Gisle, "Calculation of average psnr differences between rd curves," I T U-T Q.6/SG16 VCEG 13th meeting, https://www.itu.int/wflp3/av-arch/video-site/0104_Aus/VCEG-M33.doc, 2001, 4 pages.
Katsavounidis, Ioannis, "NETFLIX-"El Fuente" video sequence details and scenes", Jul. 28, 2015, http://www.cdvl.org/documents/EIFuente_summary.pdf, 64 pages.
Katsavounidis, Ioannis, "NETFLIX- "Chimera" video sequence details and scenes", Nov. 2, 2015, https://www.cdvl.org/documents/NETFLIX_Chimera_4096x2160_Download_Instructions.pdf, 189 pages.
Wang et al., "Image Quality Assessment: From Error Visibility to Structural Similarity", DOI:10.1109/TIP.2003.819861, IEEE Transactions on Image Processing, vol. 13, No. 4, Apr. 2004, pp. 600-612.
Sheikh et al., "Image Information and Visual Quality", DOI:10.1109/TIP.2005.859378, IEEE Transactions on ImageProcessing, vol. 15, No. 2, Feb. 2006, pp. 430-444.
Nelflix / VMAF, https://github.com/Nelflix/vmaf, retrieved Apr. 17, 2020, 4 pages.
Li et al., "Full-Reference Video Quality Assessment by Decoupling Detail Losses and Additive Impairments", DOI: 10.1 109/TCSVT.2012.2190473, Circuits and Systems for Video Technology, IEEE Transactions, vol. 22, No. 7, Jul. 2012, pp. 1100-1112.
Winkler, Stefan, "Analysis of Public Image and Video Databases for Quality Assessment", DOI:10.1109/JSTSP.2012.2215007, IEEE Journal of Selected Topics in Signal Processing, vol. 6, No. 6, Oct. 2012, pp. 516-625.
Cortes et al., "Support-Vector Networks", Machine Learning, vol. 20, 1995, pp. 273-297.
Katsavounidis, Ioannis, "Dynamic optimizer—a perceptual video encoding optimization framework", Netflix Technology Blog, https://netflixtechblog.com/dynamic-optimizer-a-perceptual-video-encoding-optimization-framework-e19f1e3a277f, Mar. 5, 2018, 22 pages.
Manohara et al., "Optimized shot-based encodes: Now streaming!", Netflix Technology Blog, https://netflixtechblog.com/optimized-shot-based-encodes-now-streaming-4b9464204830, March 9, 2018, 9 pages.
"mirror / x264", https://github.com/mirror/x264, retrieved May 17, 2020, 1 page.
"FFmpeg / FFmpeg", https://github.com/FFmpeg/FFmpeg, retrieved May 17, 2020, 3 pages.
videolan / x265, https://github.com/videolan/x265, retrieved May 17, 2020, 1 page.
"Eve-VP9 Maximize the Capabilities of VP9 for Your Video Streaming", Two Orioles, https://www.twoorioles.com/eve-vp9, retrieved May 17, 2020, 7 pages.
Wang et al., "Videoset: A large-scale compressed video quality dataset based on JND measurement", http://dx.doi.org/10.1016/j.jvcir.2017.04.009, Journal of Visual Communication and Image Representation, vol. 46, 2017, pp. 292-302.
Mareddy et al., "Simplifying Media Innovation at Netflix with Archer", Netflix Technology Blog, https://netflixtechblog.com/simplifying-media-innovation-at-netflix-with-archer-3f8cbb0e2bcb, Jun. 20, 2018, 13 pages.
Nelflix Technology Blog, https://nelflixtechblog.com/per-tille-encode-Jptimization-7e99442b62a2, Dec. 14, 2015, 13 pages.
Final Office Action received for U.S. Appl. No. 15/902,976 dated Jul. 10, 2020, 54 pages.

(56) References Cited

OTHER PUBLICATIONS

Non-Final Office Action received for U.S. Appl. No. 16/543,476 dated Jul. 6, 2020, 97 pages.
Non-Final Office Action received for U.S. Appl. No. 16/053,754 dated Aug. 12, 2020, 29 pages.
Notice of Allowance received for U.S. Appl. No. 15/902,970 dated Sep. 4, 2020, 44 pages.
Final Office Action received for U.S. Appl. No. 15/902,971 dated Dec. 10, 2020, 51 pages.
Notice of Allowance received for U.S. Appl. No. 15/902,976 dated Sep. 30, 2020, 18 pages.
Non-Final Office Action received for U.S. Appl. No. 16/543,476 dated Jan. 7, 2021, 129 pages.
Final Office Action received for U.S. Appl. No. 16/053,754 dated Jan. 28, 2021, 30 pages.
Notice of Allowance received for U.S. Appl. No. 16/034,303 dated Dec. 4, 2019, 15 pages.
Non-Final Office Action received for U.S. Appl. No. 16/882,386 dated Oct. 9, 2020, 42 pages.
Non-Final Office Action received for U.S. Appl. No. 15/902,971 dated Mar. 17, 2021, 46 pages.
Non-Final Office Action received for U.S. Appl. No. 16/882,386 dated Apr. 6, 2021, 21 pages.
Non-Final Office Action received for U.S. Appl. No. 15/902,971, dated Mar. 17, 2021, 36 pages.
Ortega, Antonio, "Optimal bit allocation under multiple rate constraints", Proceedings of Data Compression Conference—DCC '96, 10.1109/DCC.1996.488340, 1996, pp. 349-358.

* cited by examiner

OPTIMIZING ENCODING OPERATIONS WHEN GENERATING ENCODED VERSIONS OF A MEDIA TITLE

CROSS-REFERENCE TO RELATED APPLICATIONS

This application is a continuation-in-part of co-pending United States patent application titled, "ITERATIVE TECHNIQUES FOR ENCODING VIDEO CONTENT," filed on Feb. 22, 2018 and having Ser. No. 15/902,976, which claims the priority benefit of the United States Provisional Patent Application titled, "VIDEO ENCODING AT SCALE: PERCEPTUALLY OPTIMAL ENCODING OF VIDEO SEQUENCES," filed on Feb. 23, 2017 and having Ser. No. 62/462,873, claims the priority benefit of the United States Provisional Patent Application titled, "ENCODING TECHNIQUE FOR OPTIMIZING DISTORTION AND BITRATE," filed on Jul. 18, 2017 and having Ser. No. 62/534,170, and claims the priority benefit of the United States Provisional Patent Application titled, "ENCODING TECHNIQUE FOR OPTIMIZING DISTORTION AND BITRATE," filed on Aug. 25, 2017 and having Ser. No. 62/550,517. The subject matter of these related applications is hereby incorporated herein by reference.

BACKGROUND

Field of the Various Embodiments

Embodiments of the present invention relate generally to media technology and, more specifically, to optimizing encoding operations when generating encoded versions of a media title.

Description of the Related Art

A typical media streaming service provides access to a library of media titles that can be viewed on a range of different endpoint devices. Each endpoint device may connect to the media streaming service under different connection conditions that affect bandwidth and latency. In addition, each different endpoint device may include different hardware for outputting the media title to end user(s). For example, a given endpoint device could include a display screen having a particular screen size and a particular screen resolution.

In many implementations, an endpoint device that connects to a media streaming service executes an endpoint application that determines, for a given media title, an appropriate encoded version of the media title to stream to the endpoint device based on the connection conditions and the properties of the endpoint device. More specifically, the endpoint application attempts to select a particular encoded version of the media title that provides the best possible visual quality during playback of the media title on the endpoint device while avoiding playback interruptions due to buffering or re-buffering.

In some implementations, the endpoint application selects the particular encoded version of the media title based on a bitrate ladder. The bitrate ladder is designed to achieve a target visual quality during playback of a media title based on an available bandwidth. Each rung in the bitrate ladder specifies a different bitrate-resolution pair corresponding to a different pre-generated encoded version of the media title. To generate the encoded version of a media title corresponding to a given bitrate-resolution pair, the media content associated with the media title is sampled at the resolution to generate sampled media content. One or more encoding parameter values are selected based on the bitrate and then used to encode the sampled media content.

One drawback of the above "monolithic" encoding technique is that the complexity of the media content associated with a given media title oftentimes varies across the media title; whereas, the resolution and the encoding parameter value(s) used to encode the media content do not vary. As a result, encoding relatively simple portions of the media title may consume more computational and storage resources than what is necessary to meet the target visual quality. For example, a relatively simple portion of a media title could have the same visual quality regardless of whether that portion of media content is encoded using a bitrate of 560 kilobits per second (kbps) or using a bitrate of 3000 kbps. Among other things, such encoding inefficiencies waste computational and storage resources and increase the bandwidth required to stream encoded versions of media titles to endpoint devices.

In other implementations, to reduce these types of encoding inefficiencies, a media streaming service provider varies the combinations of resolution and encoding parameter value(s) or "encoding points" across the media title. Typically, a sequence-based encoding application partitions the media title into different shot sequences, where each shot sequence includes media content captured continuously from a given camera or other capture point. The sequence-based encoding application then encodes each shot sequence numerous times at a variety of different encoding points to generate encoded shot sequences. Subsequently, the sequence-based encoding application performs optimization operations to generate different optimized encoded versions of the media title. Each optimized encoded version of the media title includes a different combination of the encoded shot sequences that span the length of the media title, and the encoding point may vary between the constituent encoded shot sequences.

Using these types of sequence-based encoding techniques, the reduction in the encoding inefficiencies typically associated with monolithic encoding techniques described above correlates to the number of encoding points used to generate the encoded shot sequences. However, as the number of encoding points increases, the time and amount of computational resources required to generate the different encoded shot sequences increase. Accordingly, because of time or computational resource constraints, a media streaming service provider may limit the number of encoding points and, consequently, the associated reduction in encoding inefficiencies.

For example, suppose that the sequence-based encoding application nominally generates encoded shot sequences for the 384 different encoded points associated with 6 available resolutions and 64 available values for an encoding parameter. If a given media title includes 100 shot-sequences, then the sequence-based encoding application would generate 38400 different encoded shot sequences. For a media streaming service provider that encodes thousands of media titles, the total time and computational resources required to generate the different optimized encoded versions of the media titles based on 384 encoding points could become quite prohibitive. In such situations, the media streaming service provider could configure the sequence-based encoding application to disregard some of the nominal encoding points. But, because the resulting optimized encoded versions of the media title would not include any shot sequences encoded at the disregarded encoding points, the overall reduction in encoding inefficiencies would be limited.

As the foregoing illustrates, what is needed in the art are more effective techniques for encoding media titles.

SUMMARY

One embodiment of the present invention sets forth a computer-implemented method for encoding a media title for streaming. The method includes partitioning a plurality of shot sequences associated with a media title into a plurality of clusters based on at least one feature that characterizes at least one of media content and encoded media content associated with the media title; encoding a first shot sequence using a first encoding point to generate a first encoded shot sequence, where the first encoding point and the first shot sequence are associated with a first cluster included in the plurality of clusters; encoding a second shot sequence using a second encoding point to generate a second encoded shot sequence, where the second encoding point and the second shot sequence are associated with a second cluster included in the plurality of clusters; and generating a first encoded media sequence based on the first encoded shot sequence and the second encoded shot sequence, where at least a portion of the first encoded media sequence is subsequently streamed to an endpoint device during playback of the media title.

At least one technological improvement of the disclosed techniques relative to prior art is that shot sequences having similar features are encoded using the same optimized encoding point, while shot sequences having different features are encoded using different optimized encoding points. Consequently, the disclosed techniques reduce the encoding inefficiencies typically associated with conventional encoding techniques that encode the media title using a single encoding point. Further, because the disclosed techniques determine the optimized encoding points based on a subset of the shot sequences, the time and amount of computational resources required to generate an encoded version of the media title are reduced relative to prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

Figure 1:
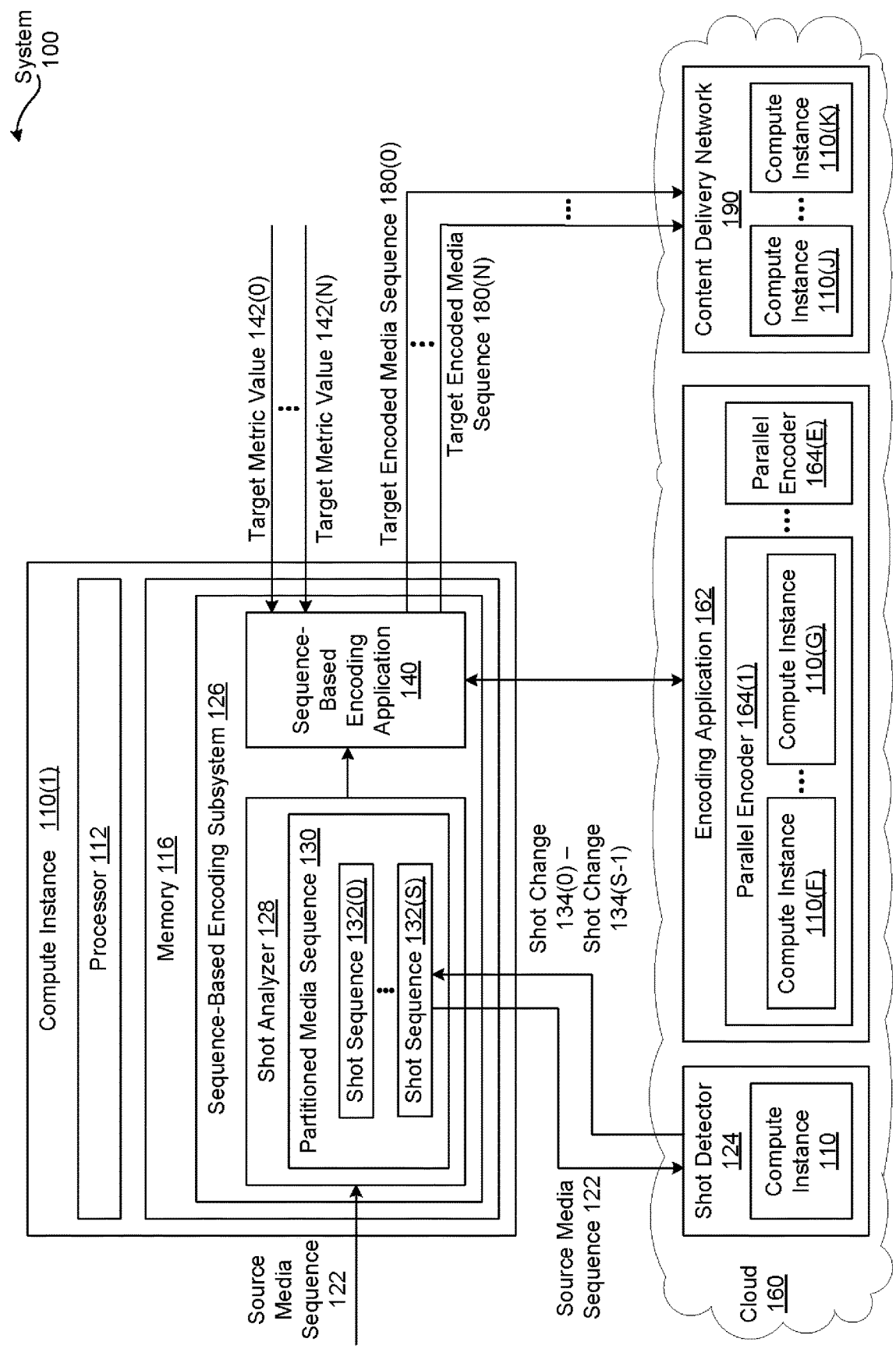
FIG. 1 is a conceptual illustration of a system configured to implement one or more aspects of the present invention.

In the following description, numerous specific details are set forth to provide a more thorough understanding of the various embodiments. However, it will be apparent to one of skilled in the art that the inventive concepts may be practiced without one or more of these specific details.

To optimize the overall visual experience that a media streaming service provides to viewers, the media streaming service provider oftentimes generates a bitrate ladder for each media title. The bitrate ladder for a given media title allows client-side endpoint devices to achieve a target visual quality during playback of the media title based on an available bandwidth. Each rung in the bitrate ladder specifies a different bitrate-resolution pair corresponding to a different pre-generated encoded version of the media title.

Some media streaming service providers use monolithic encoding techniques to generate the different encoded versions of the media title. Namely, the resolution and encoding parameter value(s) used to encode the media content associated with a given media title do not vary across the media title. However, because the complexity of the media content associated with a given media title typically varies across the media title, the resulting encoded versions of the media title are often associated with encoding inefficiencies. More specifically, encoding relatively simple portions of the media title may consume more computational and storage resources than are necessary to meet the target visual quality. Further, the bandwidth required to stream the encoded versions of the media title may be unnecessarily large.

For example, a movie could include relatively complex action portions and relatively simple monologues. The monologues could have the same visual quality regardless of whether the monologues are encoded using a bitrate of 3000 kilobits per second (kbps) or encoded using a bitrate of 560 kbps. By contrast, the required resources (e.g., computational resources, storage resources, bandwidth, etc.) associated with encoding the monologues using a bitrate of 3000 kbps exceed the required resources associated with encoding the monologues using a bitrate of 560 kbps. Accordingly, encoding the entire movie using a bitrate of 3000 kbps needlessly wastes computational and storage resources and unnecessarily increases the bandwidth required to stream the encoded version of the movie to endpoint devices.

To reduce the encoding inefficiencies typically associated with monolithic encoding techniques, some media streaming service providers use a sequence-based encoding application to generate different optimized encoded versions of a given media title. The sequence-based application varies the combinations of resolution and encoding parameter value(s) across the media title based on a target metric value, such as a target visual quality score or a target bitrate. Each optimized encoded version of the media title is associated with a different target perceptual visual quality metric value.

Typically, the sequence-based encoding application partitions the media title into different shot sequences, where each shot sequence includes media content captured continuously from a given camera or other capture point. The sequence-based encoding application then encodes each shot sequence numerous times at a variety of different encoding points to generate encoded shot sequences. Each encoding point is a different combination of a resolution and encoding parameter value(s). Subsequently, the sequence-based encoding application performs optimization operations to generate different optimized encoded versions of the media title. Each optimized encoded version of the media title includes a different combination of the encoded shot sequences that span the length of the media title, and the encoding point may vary between the constituent encoded shot sequences. As a result, the sequence-based encoding application reduces the encoding inefficiencies typically associated with monolithic encoding techniques described above.

As the number of encoding points increases, the reduction in the encoding inefficiencies also increases. However, as the number of encoding points increases, the time and amount of computation resources required to generate the different encoded versions of a given media title also increase. To reduce the time and amount of computational resources required to encode a library of media titles, a media streaming service provider could configure the sequence-based encoding application to consider only a subset of the pertinent encoding points. However, because the resulting encoded versions of the media titles would not include any encoded shot sequences generated using the disregarded encoding points, the overall reduction in encoding inefficiencies would be limited.

For example, suppose that the sequence-based encoding application nominally generates encoded shot sequences for the 384 encoding points associated with 6 available resolutions and 64 available values (from 0 to 61) for an encoding parameter. For a media title that includes 100 shot-sequences, the sequence-based encoding application would generate 38400 different encoded shot sequences. To reduce the time and amount of computational resources required to generate the different encoded versions of the media title, the media streaming service provider could re-configure the sequence-based encoding application to consider only the 3 values of 0, 26, and 51 for the encoding parameter. Because the sequence-based encoding application would generate 1800 different encoded shot sequences instead of 38400 different encoded shot sequences, the time and amount of computational resources required to generate the different encoded versions of the media title would be substantially decreased. However, each of the encoded shot sequences included in the resulting encoded versions of the media title would be generated using an encoding parameter value of 0, 26, or 51. Since the variation in the value of the encoding parameter across the media title would be limited, the overall reduction in encoding inefficiencies would also be limited.

With the disclosed techniques, however, a media streaming service provider can reduce the time and computational resources used to encode shot sequences when performing sequence-based encoding of a given media title without reducing the number of useful encoding points. Because the resulting encoded versions of the media title can include encoded shot sequences associated with any of the encoding points, the disclosed techniques do not limit the reduction in encoding inefficiencies associated with monolithic techniques. The disclosed techniques include feature-based encoding, pre-encoding, encoding point interpolation, and encoding point mapping. Notably, any number of the disclosed techniques may be combined with any number of the other disclosed techniques.

In feature-based encoding, the sequence-based encoding application partitions the shot sequences into clusters based on any number of features of the media content. Examples of features include, without limitation, brightness, colorfulness, and a degree of motion uniformity, to name a few. For each cluster, the sequence-based encoding application determines a representative shot sequence and designates the remaining shot sequences as non-representative shot sequences. The sequence-based encoding application encodes each of the representative shot sequences using each of the encoding points to generate encoded shot sequences. The sequence-based encoding application then performs optimization operations based on the encoded shot sequences to generate cluster encoding recipes. Each cluster encoding recipe is associated with a different target metric value and specifies a list of optimized encoding points, where each optimized encoding point is associated with a different cluster. For each cluster, the sequence-based encoding application generates additional encoded shot sequences based on the associated non-representative shot sequences and the associated optimized encoding points specified in the cluster encoding recipes. Finally, the sequence-based application generates optimized encoded versions of the media title based on the encoded shot sequences and the cluster encoding recipes.

One advantage and technological advancement of feature-based encoding relative to prior art approaches is that shot sequences having similar features are encoded using the same optimized encoding point, while shot sequences having different features are encoded using different optimized encoding points. Encoding each shot sequence using an encoding point that is optimized based on a similar shot sequence reduces the encoding inefficiencies typically associated with monolithic encoding techniques. Further, because the disclosed techniques determine the optimized encoding points based on a subset of the shot sequences, the time and amount of computational resources required to generate optimized encoded versions of the media title are reduced relative to prior art approaches.

For example, suppose that a sequence-based encoding application is used to generate a single encoded version of a media title that includes 100 shot sequences based on 1 target metric value and 384 different encoding points. Further, suppose that the sequence-based encoding application partitions the 100 shot sequences into two different clusters—a colorful action cluster and a monochromatic monologue cluster. Configuring the sequence-based encoding application to optimize the encoding points per cluster instead of per shot sequence reduces the total number of encoded shot sequences that the sequence-based encoding application generates from 38,400 to 866.

In pre-encoding, the sequence-based encoding application varies a tradeoff between speed and quality associated with encoding media content to reduce the overall time required to generate the encoded shot sequences. The sequence-based encoding application generates pre-encoded shot sequences based on the encoding points, the shot sequences, and a relatively fast encoding process. The sequence-based encoding application then performs optimization operations based on the pre-encoded shot sequences to generate encoding recipes. Each encoding recipe is associated with a different target metric value and specifies a list of optimized encoding points, where each optimized encoding point is associated with a different shot sequence. For each target metric value, the sequence-based encoding application then generates an optimized encoded version of the media title based on the associated encoding recipe, the shot sequences, and a relatively slow encoding process.

One advantage and technological advancement of pre-encoding relative to prior art approaches is that a relatively fast encoding process is used to determine optimized encoding points, whereas a relatively slow encoding process is used to generate an optimized encoded version of a given media title based on the optimized encoding points. Because each shot sequence is associated with a different optimized encoding point, the encoding inefficiencies typically associated with monolithic encoding techniques are reduced. Further, by using a relatively fast encoding process to determine the optimized encoding points, the time and amount of computational resources required to generate the optimized encoded version of the media title are reduced relative to prior art approaches.

For example, suppose that the sequence-based encoding application is used to generate a single encoded version of a media title that includes 100 shot sequences based on 1 target value and 384 encoding points. Configuring the sequence-based encoding application to perform pre-encoding reduces the number of encoded shot sequences generated using the relatively slow encoding process from 38,400 to 100.

In encoding point interpolation, the sequence-based encoding application designates a portion of the encoding points as "initial" encoding points and the remaining encoding points as "estimated" encoding points. The sequence-based encoding application encodes the shot sequences using the initial encoding points to generate corresponding encoded shot sequences. For each of the encoded shot sequences, the sequence-based encoding application then computes optimization data, such as bitrate and distortion level. Subsequently, the sequence-based encoding application performs interpolation operations based on the optimization data to generate different estimated optimization data for each of the estimated encoding points. The sequence-based encoding application then performs optimization operations based on the optimization data and the estimated optimization data to generate encoding recipes. For each estimated encoding point specified in the encoding recipes, the sequence-based encoding application generates the corresponding encoded shot sequence. The sequence-based encoding application then generates optimized encoded versions of the media title based on the encoded shot sequences and the encoding recipes.

One advantage and technological advancement of encoding point interpolation relative to prior art approaches is that the number of different encoding points at which each shot sequence included in a given media title can be encoded is increased without increasing the number of generated encoded shot sequences. Increasing the number of different encoding points at which each shot sequence can be encoded reduces the encoding inefficiencies typically associated with monolithic encoding techniques. And because generating numerous encoded shot sequences is usually time consuming and computationally expensive, reducing the number of generated encoded shot sequences optimizes the overall time and computation resources required to encode the media title at a target visual quality level relative to prior art approaches.

For example, suppose that a sequence-based encoding application is used to generate a single encoded version of a media title that includes 100 shot sequences based on 1 target value, 6 resolutions, and 64 different values for an encoding parameter. Further, suppose that the sequence-based encoding application is configured to designate the 18 encoding points associated with 3 of the encoding parameter values as initial encoding points and the remaining 342 encoding points as estimated encoding points. The total number of encoded shot sequences that the sequence-based encoding application generates decreases from 38400 to at most 1900.

Oftentimes a media streaming service provider generates encoded versions of media titles for multiple coder/decoders (codecs). A sequence-based encoding application that implements encoding point mapping generates sets of optimized encoded versions of a media file using any number of codecs based on a source encoding recipe set associated with a source codec. In operation, the sequence-based encoding application selects the codec that typically executes using the smallest amount of time and computational resources as the source codec. The sequence-based encoding application generates a source set of optimized encoded versions of a media title and a source set of encoding recipes based on the source codec. For each additional codec, the sequence-based encoding application generates an additional set of encoding recipes based on the source set of encoding recipes and an encoding point mapping engine that maps an encoding point from the source codec to a different codec. The sequence-based encoding application then generates additional sets of optimized encoded versions of the media title based on the additional codecs and the additional sets of encoding recipes.

One advantage and technological advancement of encoding point mapping relative to prior art approaches is that multiple optimized encoding recipes, each associated with a given media title and a different codec, are determined based on encoded shot sequences generated using a single codec. Using the encoding recipes to encode each shot sequence at encoding points that are optimized for both the shot sequence and the codec reduces the encoding inefficiencies typically associated with monolithic encoding techniques. Further, deriving optimized encoding recipes for multiple codecs from the encoded shot sequences generated using a single codec instead of multiple codecs reduces the time and computational resources used to perform sequence-based encoding of the media title for multiple codecs relative to prior art approaches.

For example, suppose that the sequence-based encoding application is used to generate encoded versions of a media title that includes 100 shot sequences based on 3 codecs, 1 target value, 6 resolutions, and 64 different values for an encoding parameter. The sequence-based encoding application would generate 38,440 encoded shot sequences when generating the first set of optimized encoded versions of the media title and the first set of encoding recipes. For each of the two additional codecs, the sequence-based encoding application would generate 100 encoded shot sequences. Consequently, by implementing encoding point mapping, the number of encoded shot sequences generated by the sequence-based encoding application would be reduced from 115,320 (3×38440) to 38,640.

System Overview

FIG. 1 is a conceptual illustration of a system 100 configured to implement one or more aspects of the present invention. As shown, the system 100 includes, without limitation, any number of compute instances 110 and a cloud 160. In general, the cloud 160 contains encapsulated shared resources, software, data, etc. For explanatory purposes, multiple instances of like objects are denoted with reference numbers identifying the object and parenthetical numbers identifying the instance where needed.

Any number of the compute instances 110 may reside outside the cloud 160 while other compute instances 110 may reside inside the cloud 160. In various embodiments, any number of the components of the system 100 may be distributed across multiple geographic locations. Further, any number of the components of the system 100 may be included in or distributed across one or more stand-alone devices, distributed computing environments, or clouds 160 in any combination.

As shown, each of the compute instances 110 includes, without limitation, a processor 112 and a memory 116. The processor 112 may be any instruction execution system, apparatus, or device capable of executing instructions. For example, the processor 112 could comprise a central processing unit (CPU), a graphics processing unit (GPU), a controller, a microcontroller, a state machine, or any combination thereof. The memory 116 stores content, such as software applications and data, for use by the processor 112 of the compute instance 110.

The memory 116 may be one or more of a readily available memory, such as random access memory (RAM), read only memory (ROM), floppy disk, hard disk, or any other form of digital storage, local or remote. In some embodiments, a storage (not shown) may supplement or replace the memory 116. The storage may include any number and type of external memories that are accessible to the processor 112. For example, and without limitation, the storage may include a Secure Digital Card, an external Flash memory, a portable compact disc read-only memory (CD-ROM), an optical storage device, a magnetic storage device, or any suitable combination of the foregoing.

In general, the compute instances 110 are configured to implement one or more applications. For explanatory purposes only, each application is depicted as residing in the memory 116 of a single compute instance 110 and executing on a processor 112 of the single compute instance 110. However, as persons skilled in the art will recognize, the functionality of each application may be distributed across any number of other applications that reside in the memories 116 of any number of compute instances 110 and execute on the processors 112 of any number of compute instances 110 in any combination. Further, the functionality of any number of applications may be consolidated into a single application or subsystem.

Although not shown, a media streaming service provides access to a library of media titles that can be viewed on a range of different endpoint devices. The library of media titles includes without limitation, the media title associated with the source media sequence 122. Each endpoint device may connect to the media streaming service under different connection conditions that affect, without limitation, bandwidth and latency. In addition, each different endpoint device may include different hardware for outputting the media title to end user(s). For example, a given endpoint device could include a display screen having a particular screen size and a particular screen resolution.

As described previously herein, in many embodiments, an endpoint device that connects to a media streaming service executes an endpoint application that determines, for a given media title, an appropriate encoded version of the media title to stream to the endpoint device based on the connection conditions and the properties of the endpoint device. More specifically, the endpoint application attempts to select a particular encoded version of the media title that provides the best visual quality during playback of the media title on the endpoint device while avoiding playback interruptions due to buffering or re-buffering.

The compute instances 110 are configured to efficiently generate encoded versions of media titles for streaming. More precisely, the compute instances 110 are configured to generate target encoded media sequences 180(0)-180(N) for the source media sequence 122. The source media sequence 122 includes, without limitation, any amount and type of media content that is associated with a media title. Examples of media content include, without limitation, any portion (including all) of feature length films, episodes of television programs, and music videos, to name a few. Each of the target encoded media sequences 180 is a different pre-generated encoded version of the media title and includes, without limitation, encoded media content derived from the media content included in the source media sequence 122.

The target encoded media sequences 180(0)-180(N) are associated with, respectively, target metric values 142(0)-142(N). Each of the target metric values 142 is a different value for a media metric. The media metric may be any measurement that corresponds to one or more properties of encoded video content, video content, audio content, and/or encoded audio content. In some embodiments, the media metric is a bitrate. In alternate embodiments, the media metric is a visual quality metric. Example of visual quality metrics include, without limitation, a peak signal-to-noise-ratio PSNR), a linear video multimethod assessment fusion ((VMAF) metric, and a harmonic VMAF (VMAFh), to name a few.

To efficiently reduce the encoding inefficiencies typically associated with monolithic encoding techniques described above, the system 100 includes, without limitation, a sequence-based encoding subsystem 126. The sequence-based encoding subsystem 126 optimizes the resolution and encoding parameters for each shot sequence 132 included in the source media sequence 122. A combination of resolution and any number of encoding parameters is also referred to herein as an "encoding point." Each of the shot sequences 132 includes a set of frames that usually have similar spatial-temporal properties and run for an uninterrupted period of time. The sequence-based encoding subsystem 126 resides in one of the memories 116 and executes on one of the processors 112.

As shown, the sequence-based encoding subsystem 126 includes, without limitation, a shot analyzer 128 and a sequence-based encoding application 140. Upon receiving the source media sequence 122, the shot analyzer 128 determines one or more shot changes 134 included in the source media sequence 122. Each of the shot changes 134 specifies a boundary between a different pair of the shot sequences 132. The shot analyzer 128 may determine the one or more shot changes 134 in any technically feasible fashion.

For instance, in some embodiments, the shot analyzer 128 transmits the source media sequence 122 to a shot detector 124 that resides in the cloud 160. To determine the shot changes 134, the shot detector 124 executes any number of shot detection algorithms based on the source media sequence 122. Some examples of shot detection algorithms include, without limitation, a multi-scale sum-of-absolute-differences algorithm, a motion-compensated residual energy algorithm, a histogram of differences algorithm, a difference of histograms algorithm, and so forth. The shot detector 124 then transmits the shot changes 134 to the shot analyzer 128. In alternate embodiments, the shot analyzer 128 may perform any number of shot detection operations on the source media sequence 122 to determine the shot changes 134.

The shot analyzer 128 performs partitioning operations on the source media sequence 122 based on the shot changes 134 to generate a partitioned media sequence 130 that includes, without limitation, the shot sequences 132. In some embodiments, the shot analyzer 128 may also remove extraneous pixels from the source media sequence 122. For example, the shot analyzer 128 could remove pixels included in black bars along border sections of the source media sequence 122.

In various embodiments, the sequence-based encoding subsystem 126 ensures that the initial frame of each shot sequence 132 is encoded as a key frame during encoding operations. As a general matter, a "key frame" and all subsequent frames from the same shot sequence 132 that are included in an encoded media sequence are decoded independently of any proceeding frames included the encoded media sequence.

The sequence-based encoding subsystem 126 may ensure that the different initial frames of the different shot sequences 132 are encoded as key frames in any technically feasible fashion. For instance, in some embodiments, the sequence-based encoding application 140 configures an encoding application 162 to encode frames as key frames based on a key frame location list (not shown in FIG. 1) when encoding media content. In other embodiments, the sequence-based encoding application 140 may perform any number of encoding operations to encode the different initial frames of the different shot sequences 132 as key frames when encoding media content.

As persons skilled in the art will recognize, during playback, the media title associated with the source media sequence 122 is switchable between decoded versions of different target encoded media sequences 180 at aligned key frames to optimize a viewing experience based on any number of relevant criteria. Examples of relevant criteria include the current connection bandwidth, the current connection latency, the content of the upcoming shot sequence 132, and the like.

For each of the target metric values 142(t), the sequence-based encoding application 140 implements sequence-based encoding techniques to generate an optimized target encoded media sequence 180(t) based on the shot sequences 132 and the target metric value 142(t). Various sequence-based encoding techniques are described in detail below in conjunction with FIG. 2-15. Each of the target encoded media sequences 180 includes, without limitation, S+1 encoded shot sequences (not shown in FIG. 1) that are associated, respectively, with the shot sequences 132(0)-132(S). Each of the encoded shot sequences includes encoded media content derived from the media content included in the associated shot sequence 132.

The sequence-based encoding application 140 may generate the encoded shot sequences in any technically feasible fashion. Further, as a general matter, the sequence-based encoding application 140 may generate encoded media content derived from media content based on a given resolution and given encoding parameter value(s) in any technically feasible fashion. For instance, in some embodiments, the sequence-based encoding application 140 performs sampling operations on the media content based on the resolution to generate sampled media content. Subsequently, the sequence-based encoding application 140 configures the encoding application 162 to encode the sampled media content using the encoding parameter value(s) to generate the encoded shot sequence.

As shown, the encoding application 162 resides in the cloud 160 and is configured to efficiently perform encoding operations via one or more parallel encoders 164. Each of the parallel encoders 164 may include any number of computer instances 110. In alternate embodiments, the sequence-based encoding application 140 may perform encoding operations and the system 100 may omit the encoding application 162. In the same or other embodiments, the system 100 may include a sampling application, and the sequence-based encoding application 140 may configure the sampling application to perform sampling operations.

The sequence-based encoding application 140 may perform sampling operations and encoding operations at any level of granularity (e.g., per frame, per shot sequence, per media sequence, etc.) in any combination and in any technically feasible fashion. For instance, in some embodiments, the sequence-based encoding application 140 may perform sampling operations on the source media sequence 122 based on given resolution to generate a sampled media sequence. Subsequently, for each encoding point associated with the resolution, the sequence-based encoding application 140 may configure the encoding application 162 to encode the sampled media content corresponding to associated shot sequence 132 based on the associated encoding parameters.

As described in detail previously herein, using conventional sequence-based encoding techniques, the reduction in the encoding inefficiencies typically associated with monolithic encoding techniques correlates to the number of encoding points available to generate the encoded shot sequences. However, as the number of available encoding points increases, the time and amount of computational resources required to generate target encoded media sequences increase. Accordingly, because of time or computational resource constraints, a media streaming service provider may limit the number of available encoding points and, consequently, the associated overall reduction in encoding inefficiencies.

To reduce the overall time and computational resources used to generate the target encoded media sequences 180 without limiting the number of available encoding points, the sequence-based encoding application 140 implements one or more complexity-reducing techniques. The complexity-reducing techniques disclosed herein include, without limitation, feature-based encoding, pre-encoding, encoding point interpolation, and encoding point mapping. Any number of the disclosed complexity-reducing techniques may be combined with any number of the other disclosed techniques. Feature-based encoding is described in detail in conjunction with FIGS. 2-7. Pre-encoding is described in detail in conjunction with FIGS. 8-10. Encoding point interpolation is described in detail in conjunction with FIGS. 11-13. And encoding point mapping is described in detail in conjunction with FIGS. 14-15.

After the sequence-based encoding application 140 generates the target encoded media sequences 180(0)-180(N), the sequence-based encoding application 140 transmits the target encoded video sequences 180 to a content delivery network (CDN) 190 for distribution to endpoint devices. In alternate embodiments, the sequence-based encoding application 140 may be configured to identify each of the individual encoded shot sequences that are included in the target encoded video sequences 180. The sequence-based encoding application 140 may then transmit the identified encoded shot sequences to the CDN 190 for distribution to endpoint devices.

For explanatory purposes only, the techniques described herein are described in the context of video encoding. However, as persons skilled in the art will recognize, the techniques described herein may be modified to optimize audio encoding instead of or in addition to video encoding. For example, in some embodiments, an audio track may be partitioned into "audio scenes." The audio scenes may be sampled via audio rendering hardware. The sampled audio scenes may be encoded via an audio codec that is configured via a quantization parameter and/or bitrate settings. The quality scores of the encoded audio scenes may be computed via a perceptual audio quality metric, such as the Perceptual Evaluation of Audio Quality (PEAQ) algorithm. Notably, the resolution and/or any number of encoding parameters may be optimized for each audio scene based on any of the techniques described herein in any combination.

Note that the techniques described herein are illustrative rather than restrictive, and may be altered without departing from the broader spirit and scope of the invention. Many modifications and variations on the functionality provided by the sequence-based encoding subsystem 126, the shot analyzer 128, the sequence-based encoding application 140, the shot detector 124, the encoding application 162, and the content delivery network 190 will be apparent to those of ordinary skill in the art without departing from the scope and spirit of the described embodiments. For instance, in various embodiments, one or more of the sequence-based encoding subsystem 126, the shot analyzer 128, and the sequence-based encoding application 140 may be configured to identify and operate on sets of frames for which a consistency metric lies within a specified range instead of the shot sequences 132. Each set of frames is also referred to herein as a subsequence. In a complementary fashion, an encoded set of frames is also referred to herein as an encoded subsequence.

It will be appreciated that the system 100 shown herein is illustrative and that variations and modifications are possible. For example the functionality provided by the sequence-based encoding subsystem 126, the shot analyzer 128, the encoding optimizer 140, the cluster-based encoding optimizer 260, the shot detector 124, the encoding application 162, and the content delivery network 190 as described herein may be integrated into or distributed across any number of software applications (including one), hardware devices (e.g., a hardware-based encoder), and any number of components of the system 100. Further, the connection topology between the various units in FIG. 1 may be modified as desired.

Performing Feature-Based Encoding

Figure 2:
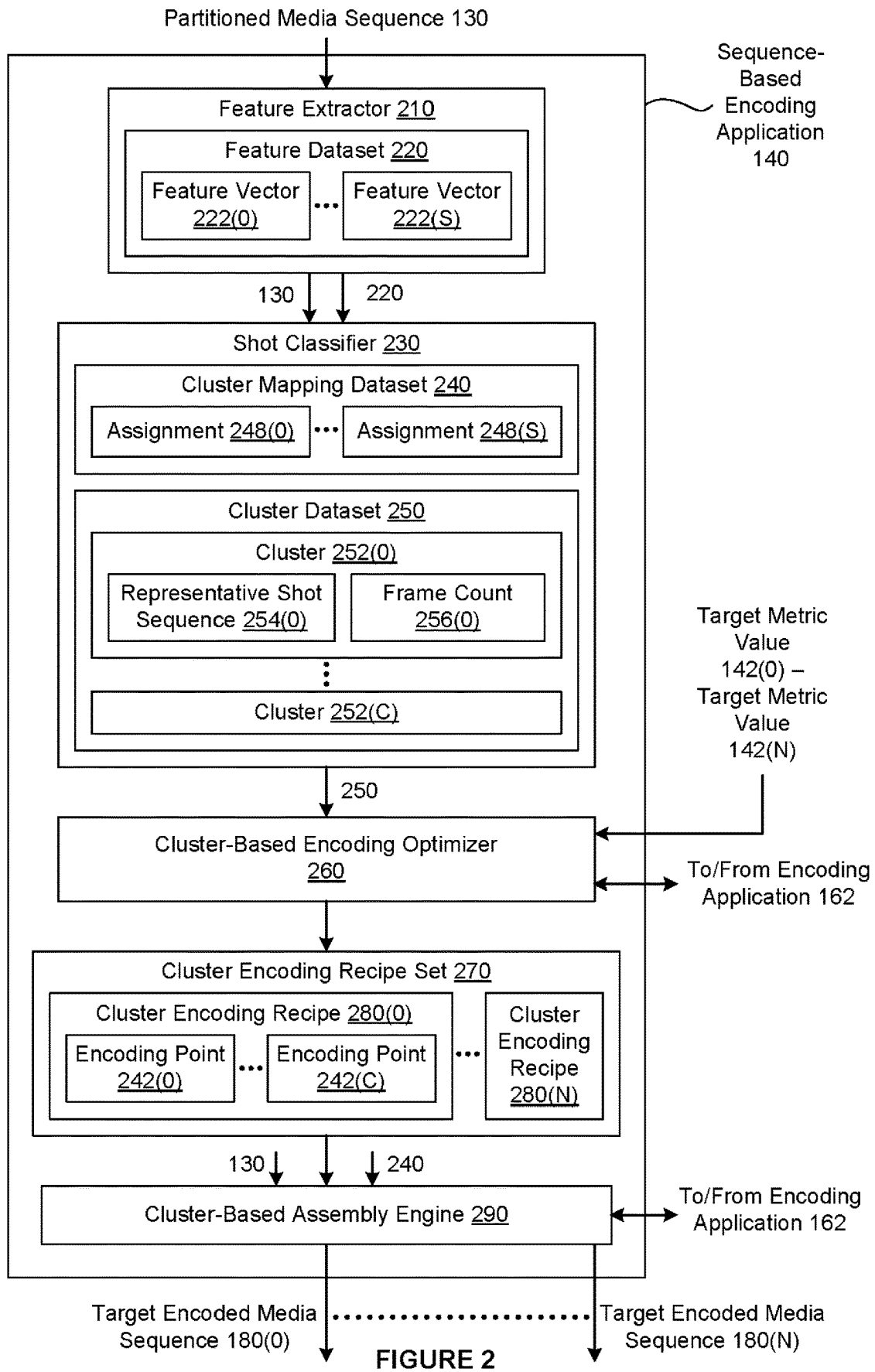
FIG. 2 is a more detailed illustration of the sequence-based encoding application of FIG. 1, according to various embodiments of the present invention.

FIG. 2 is a more detailed illustration of the sequence-based encoding application 140 of FIG. 1, according to various embodiments of the present invention. The sequence-based encoding application 140 includes, without limitation, a feature extractor 210, a shot classifier 230, and cluster dataset 250, a cluster-based encoding optimizer 260, a cluster encoding recipe set 270, and a cluster-based assembly engine 290.

As shown, the feature extractor 210 receives the partitioned media sequence 130 and generates a feature dataset 220. The feature dataset 220 includes, without limitation, feature vectors 222(0)-222(S), where (S+1) is the number of shot sequences 132 included in the partitioned media sequence 130. For each shot sequence 132(x) included in the partitioned media sequence 130, the feature extractor 220 extracts the associated feature vector 222(x). The feature vector 222(x) includes, without limitation, values for any number and type of features (not shown). As referred to herein, a feature may be any characteristic of media content. Examples of features include, without limitation, contrast, brightness, colorfulness, a level of texture detail, a degree of motion uniformity, a number of edges, a count of human faces, a percentage of nature, and so forth. The feature extractor 220 may perform any number and type of feature extraction operations in any technically feasible fashion. For instance, in some embodiments, the feature extractor 220 computes the feature vectors 222 based on image and motion statistics associated with the shot sequences 132. The feature extractor 210 may compute the different feature vectors 222 sequentially, concurrently, or any combination thereof.

The shot classifier 230 receives the partitioned media sequence 130 and the feature dataset 220 and generates a cluster mapping dataset 240 and a cluster dataset 250. First, the shot classifier 230 performs any number of types of classification operations based on the feature dataset 220 to partition the shot sequences 132 across any number of clusters 252. Each of the clusters 252 is associated with one or more of the shot sequences 132, whereas each of the shot sequences 132 is associated with one of the clusters 252. In general, if the feature vector 222(x) and the feature vector 222(y) are relatively similar, then the shot classifier 230 assigns the associated shot sequences 132(x) and 132(y) to the same cluster 252. By contrast, if the feature vector 222(x) and the feature vector 222(y) are relatively dissimilar, then the shot classifier 230 assigns the associated shot sequences 132(x) and 132(y) to different clusters 252. The shot classifier 230 may implement any number and type of techniques to perform the classification operations. For instance, in various embodiments, the shot classifier 230 may implement a K-means classification algorithm or a trained neural network to perform the classification operations.

The cluster mapping dataset 240 includes, without limitation, assignments 248(0)-242(S), where the assignment 248(x) specifies the cluster 252 to which the shot sequence 132(x) is assigned. The shot sequences 132 that are assigned to the cluster 252(x) are also referred to herein as the shot sequences 132 associated with the cluster 252(x). The cluster dataset 250 includes without limitation, any number of the clusters 252. As shown, each of the clusters 252(x) includes, without limitation, a representative shot sequence 254(x) and a frame count 256(x). The representative shot sequence 254(x) is one of the shot sequences 254 assigned to the cluster 252(x). The shot classifier 230 may determine the representative shot sequence 254(x) in any technically feasible fashion.

For instance, in some embodiments, the shot classifier 254 computes a centroid (not shown) of the cluster 252(x) based on the feature vectors 222 of the shot sequences 132 assigned to the cluster 252(x). Subsequently, the shot classifier 254 determines the feature vector 222(k) that lies closest to the centroid of the cluster 252(x) and designates the associated shot sequence 132(k) as the representative shot sequence 254(x). For explanatory purposes, the shot sequences 132 that are not also representative shot sequences 254 are referred to here as "non-representative" shot sequences 132.

For each cluster 252(x), the shot classifier 230 computes the associated frame count 256(x) based on the number of frames included in the shot sequences 132 assigned to the cluster 252. More precisely, the shot classifier 252 performs summation operations between the number of frames in each of the shot sequences 132 assigned to the cluster 252 to compute the associated frame count 256. For example, if the shot sequence 132(0) having 200 frames and the shot sequence 132(5) having 100 frames are the shot sequences 132 assigned to the cluster 252(0), then the shot classifier 252 sets the frame count 256(0) equal to 300.

The cluster-based encoding optimizer 260 computes the cluster encoding recipe set 270 based on the cluster dataset 250. For each cluster 252(x), the cluster-based encoding optimizer 260 encodes the representative shot sequence 254(x) using multiple encoding points 242 to generate encoded shot sequences (not shown in FIG. 2) associated with the cluster 252(x). Each of the encoding points 242 specifies a resolution and one or more encoding parameters. Subsequently, the cluster-based encoding optimizer 260 performs optimization operations based on the encoded shot sequences and the associated frame counts 256 to generate the cluster encoding recipe set 270. The cluster-based encoding optimizer 260 is described in greater detail in conjunction with FIG. 3.

The encoding recipe set 270 describes how to generate the target encoded media sequences 180. As shown, the cluster encoding recipe set 270 includes, without limitation, cluster encoding recipes 280(0)-280(N). Each cluster encoding recipe 280(x) is associated with a different target metric value 142(x) and includes, without limitation, a different encoding point 242 for each of the clusters 252. Together, the encoding points 242 included in the cluster encoding recipe 280(x) specify how to encode the clusters 252 to generate the target encoded media sequence 180(x) that is optimized for the target metric value 142(x).

The cluster-based assembly engine 290 generates the target encoded media sequences 180 based on the shot sequences 132 included in the partitioned media sequence 130, the cluster mapping dataset 240, and the cluster encoding recipe set 270. For each of the clusters 252, the cluster-based assembly engine 290 encodes each of the associated non-representative shot sequences 132 using the associated encoding points 242 included in the cluster encoding recipes 280 to generate the associated encoded shot sequences. For example, the cluster-based assembly engine 290 encodes the non-representative shot sequence 132(x) using the encoding point 242(x) included in the cluster encoding recipe 280(0), the encoding point 242(x) included in the cluster encoding recipe 280(1), etc. Note that if multiple cluster encoding recipes 280 specify the same encoding point 242(x) for the shot sequence 132(x), then the cluster-based assembly engine 290 generates a single associated encoded shot sequence for the combination of the shot sequence 132(x) and the encoding point 342(x).

Subsequently, for each cluster encoding recipe 280(x), the cluster-based assembly engine 290 generates the target encoded media sequence 180(x) based on the cluster encoding recipe 280(x), the encoded shot sequences associated with the non-representative shot sequences 132 and the encoded shot sequences associated with the representative shot sequences 254. As described previously herein, the encoded shot sequences associated with the representative shot sequences 254 are generated by the cluster-based encoding optimizer 260 as part of generating the cluster encoding recipe set 270.

More specifically, to generate the target encoded media sequence 180(x), the cluster-based assembly engine 290 aggregates a different encoded shot sequence for each shot sequence 132 as per the cluster encoding recipe 280(x). In alternate embodiments, the cluster-based assembly engine 290 may generate the target encoded media sequences 180 in any technically feasible fashion based on optimized encoding points 242 associated with the different clusters 252. Finally, the cluster-based assembly engine 290 transmits the target encoded media sequences 180 to the CDN 190 for distribution to endpoint devices.

Figure 3:
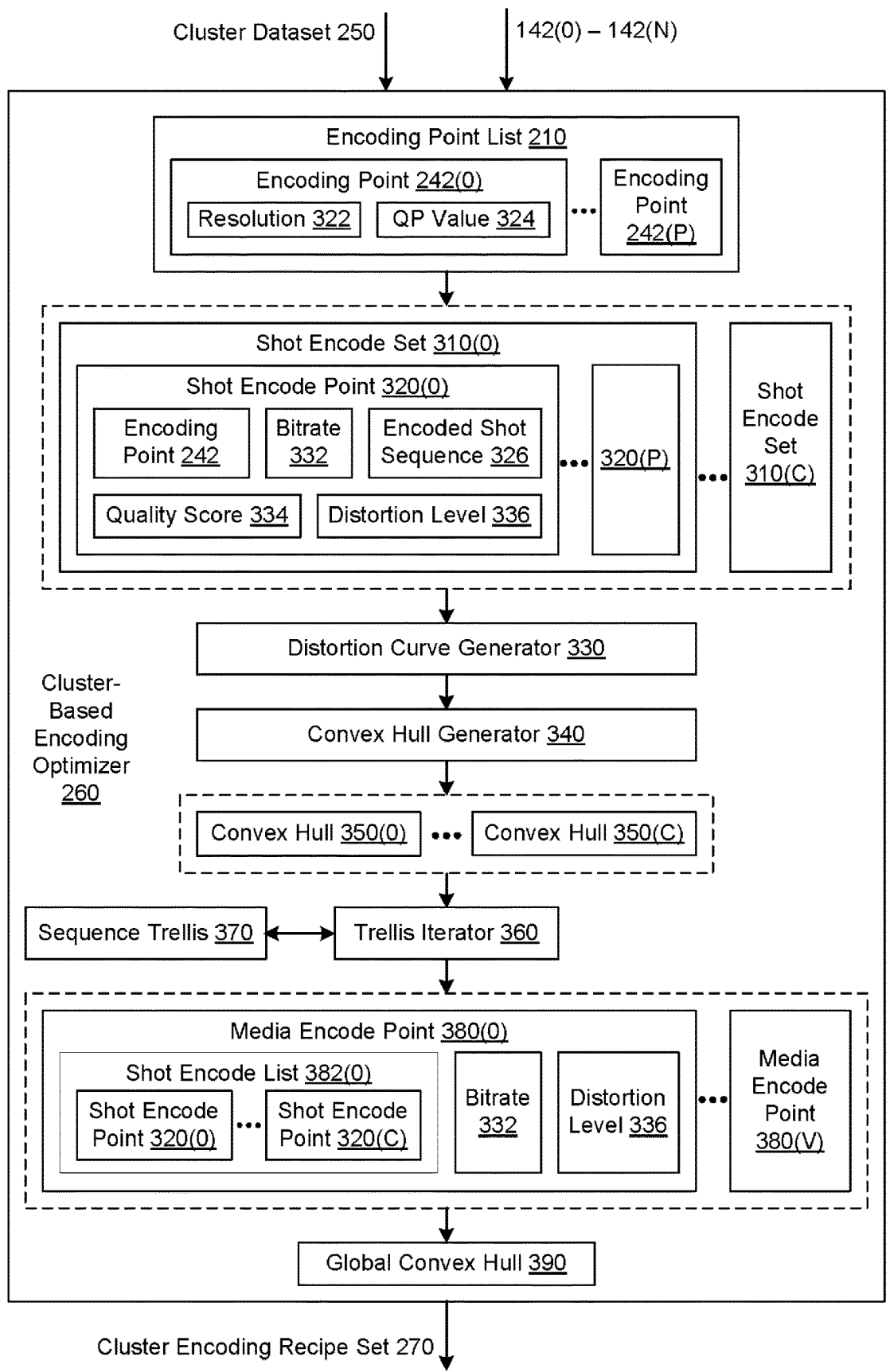
FIG. 3 is a more detailed illustration of the cluster-based encoding optimizer of FIG. 2, according to various embodiments of the present invention.

FIG. 3 is a more detailed illustration of the cluster-based encoding optimizer 260 of FIG. 2, according to various embodiments of the present invention. The cluster-based encoding optimizer 260 includes, without limitation, an encoding point list 210, shot encode sets 310, a distortion curve generator 330, a convex hull generator 340, convex hulls 350, a trellis iterator 360, a sequence trellis 370, media encode points 380, and a global convex hull 390. The total number of the shot encode sets 310 and the total number of the convex hulls 350 are both equal to the number of clusters 252 included in the cluster dataset 250. In general, the cluster 252(x) (and the associated representative shot sequence 254(x)) is associated with the shot encode set 310(x) and the convex hull 350(x).

The encoding point list 210 includes any number of the encoding points 242. Each encoding point 242 includes, without limitation, a resolution 322 and a quantization parameter (QP) value 324. The quantization parameter allows a monotonic performance in terms of bitrate and distortion when encoding a video content. The higher the QP value, the lower the resulting bitrate at the expense of lower quality. In alternate embodiments, each of the encoding points 242 may include any number and type of encoding parameters instead of or in addition to the QP value 324.

The cluster-based encoding optimizer 260 may generate the encoding list 210 in any technically feasible fashion. For instance, in some embodiments, the cluster-based encoding optimizer 260 generates the encoding list 210 based on a fixed set of resolutions 322 and the codec implemented by the encoding application 162. More specifically, suppose that the fixed set of resolutions 322 includes 6 different resolutions 322 and the codex permits 64 different QP values 324. The cluster-based encoding optimizer 260 would generate the encoding list 210 that included the encoding points 242(0)-242(383).

In alternate embodiments, the cluster-based encoding optimizer 260 may include a different encoding point list 210(x) for each of the clusters 252(x). Further, the encoding points 242 included in the encoding list 210(x) may be different than the number of encoding points 242 included in any of the other encoding lists 210. In such embodiments, the techniques described herein are modified to reflect the cluster-specific encoding point lists 210. In the same or other embodiments, the cluster-based encoding optimizer 260 may implement an iterative process in which the cluster-based encoding optimizer 260 iteratively refines the range of encoding points 242 in order to efficiently converge to the cluster encoding recipe set 270.

Each of the shot encode sets 310 includes, without limitation, any number of shot encode points 320. Each of the shot encode points 320 includes, without limitation, the encoding point 242, an encoded shot sequence 326, a bitrate 332, any number of quality scores 334, and a distortion level 336. In alternate embodiments, the shot encode point 320 may include any number and type of encoding parameters instead of or in addition to the QP value 324.

The cluster-based encoding optimizer 260 generates the shot encode sets 310(0)-310(C) based on the cluster dataset 250 and the encoding point list 210. For each encoding point 242(y) included in each encoding list 210(x), the cluster-based encoding optimizer 260 generates a corresponding shot encode point 320(y) and adds the shot encode point 320(y) to the shot encode set 310(x). In operation, the cluster-based encoding optimizer 260 encodes the representative shot sequence 132(x) included in the cluster 252(x) using the encoding point 242(y). Subsequently, the cluster-based encoding optimizer 260 computes the bitrate 332, the quality score 334, and the distortion level 336 associated with the encoded shot sequence 326. The cluster-based encoding optimizer 260 then generates the shot encode point 320(y) that includes, without limitation, the encoded shot sequence 326 as well as the encoding point 242, the bitrate 332, the quality score 334, and the distortion level 336 associated with the encoded shot sequence 326. Finally, the cluster-based encoding optimizer 260 includes the new shot encode point 320(y) in the shot encode set 310(x).

In general, the cluster-based encoding optimizer 260 may generate the encoded shot sequence 326 and determine the associated quality score 334, the associated bitrate 332, and the associated distortion level 336 in any technically feasible fashion. To generate the encoded shot sequence 326, in some embodiments, the cluster-based encoding optimizer 260 performs sampling operations on the associated video content based on the resolution 322 to generate sampled video content. Subsequently, the cluster-based encoding optimizer 260 configures the encoding application 162 to perform encoding operations on the sampled video content based on the QP value 324 to generate the encoded shot sequence 326. The cluster-based encoding optimizer 260 may generate the encoded shot sequence 326 based on any technically feasible encoding algorithm(s) in any technically feasible fashion. Examples of encoding algorithms include advanced video coding (AVC), and high-efficiency video encoding (HEVC), to name a few.

In some embodiments, to determine the quality score 334 associated with the encoded shot sequence 326, the cluster-based encoding optimizer 260 decodes the encoded shot sequence 326 to generate a decoded shot sequence. The cluster-based encoding optimizer 260 then re-samples (i.e., up-samples or down-samples) the decoded shot sequence to a target resolution to generate a re-constructed shot sequence that is relevant to the display characteristics of a class of endpoint devices.

In alternate embodiments, the cluster-based encoding optimizer 260 may compute any number of quality scores 334 for any number or resolutions. For example, a certain video may be delivered in 3840×2160 resolution, yet be intended to be consumed by a large number of displays in 1920×1080 resolution. Another class of endpoint devices, for example laptop computers, is expected to display the same video in 1280×720 resolution. Yet another class of endpoint devices, for example, tablet or smartphone devices, is expected to display the same video in 960×540 resolution. The cluster-based encoding optimizer 260 could up-sample the decoded shot sequence to all these target resolutions in order to assess quality, when considering one of these different classes of endpoint devices, correspondingly.

The cluster-based encoding optimizer 260 then analyzes the re-constructed shot sequence to generate the quality score 334 for an objective quality metric (QM). For instance, in some embodiments the cluster-based encoding optimizer 260 implements a VMAF (or harmonic VMAF) algorithm to generate a VMAF score for each encoded shot sequence 326 based on the associated re-constructed shot sequence. Although a multitude of video quality metrics, such as VMAF scores, can be calculated at different target resolutions, it should be clear that, when comparing qualities among encoded shot sequences 386 associated with different resolutions 322, applications need to use the same target resolution for re-sampling, after decoding. For instance, in some embodiments, the cluster-based encoding optimizer 260 re-samples the decoded shot sequence to 1920×1080 to generate the reconstructed shot sequence for each encoded shot sequence 326. Subsequently, the cluster-based encoding optimizer 260 computes the quality score 334 for the encoded shot sequence 326 based on the associated re-constructed shot sequence.

The cluster-based encoding optimizer 260 may compute the bitrate 332 based on the resolution 334 in any technically feasible fashion. For instance, in some embodiments, the cluster-based encoding optimizer 260 may divide the total number of bits needed for the resolution 334 by the length of the associated shot sequence 132. In the same or other embodiments, the cluster-based encoding optimizer 260 may compute the distortion level 336 based on the quality score 334 and any technically feasible technique for converting quality to distortion. For example, the cluster-based encoding optimizer 260 could invert the quality score 334 to determine the distortion level 336. In another example, the cluster-based encoding optimizer 260 could subtract the quality score 334 from a constant value to determine the distortion level 336.

For each shot encode point 320, the cluster-based encoding optimizer 260 also computes a cluster duration (not shown), a cluster total bit count (not shown) and a cluster total distortion (not shown). The cluster-based encoding optimizer 260 may compute the cluster duration, the cluster total bit count, and the cluster total distortion in any technically feasible fashion. For instance, in some embodiments, the cluster-based encoding optimizer 260 computes the cluster duration based on the frame count 256 of the cluster 256 associated with the shot encode point 320. The cluster-based encoding optimizer 260 then sets the cluster total bit count equal to the product of the cluster duration and the bitrate 332 for the representative shot sequence 332 (included in the shot encode point 320). And the cluster-based encoding optimizer 260 sets the cluster total distortion to the product of the cluster duration and the distortion level 336 for the representative shot sequence 332 (included in the shot encode point 320).

For each of the clusters 252(x), the distortion curve generator 330 generates a different set of distortion curves (not shown in FIG. 3) based on the shot encode set 310(x). Each of the distortion curves included in the set of distortion curves associated with the cluster 252(x) corresponds to a different resolution 322 and includes one or more shot encode points 320 associated with the shot encode set 310(x). Accordingly, if each shot encode set 310 includes the encoding points 242 associated with 6 different resolutions 322, then the distortion curve generator 330 generates 6 different distortion curves for each cluster 252. A detailed example of how the distortion curve generator 330 generates the convex hull 350(0) based on the shot encode set 310(0) is described in conjunction with FIG. 4.

As shown, and as described in detail in conjunction with FIG. 5, the trellis iterator 360 receives the convex hulls 350 and then iteratively updates a sequence trellis 370 to generate any number of media encode points 380. The trellis iterator 360 is a software module, and the sequence trellis 370 is a data structure that is described in greater detail below in conjunction with FIGS. 5A-5D.

Each of the media encode points 380 includes, without limitation, a shot encode list 382, the bitrate 332, and the distortion level 336. The shot encode list 382 includes, without limitation, S+1 shot encode points 320—a different shot encode point 320 for each of the clusters 252. For a given media encode point 380, the bitrate 332 and the distortion level 336 specify, respectively, an overall bitrate and an overall distortion level associated with the shot encode list 382 included in the media encode point 380. Note that each shot encode point 320 included in the shot encode list 382 is associated with a different cluster 252 and a different encoding point 242 that is optimized for all of the shot sequences 132 assigned to the cluster 252.

The trellis iterator 360 computes the bitrate 332 and the distortion level 336 associated with the shot encode list 382 based on the encoded shot sequences 386 included in the shot encode list 382 and the frame counts 252. Importantly, the trellis iterator 360 modifies the bitrate 332 and the distortion level 336 computations to reflect the contributions of the non-representative shot sequences 132 associated with the shot encode list 382. More specifically, for the shot encode list 382(i), the trellis iterator 360 computes the bitrate 332 and the distortion level 336 based on the cluster durations, the cluster total bit counts, and the cluster total distortions associated with the shot encode points 320 included in the shot encode list 382(i).

Subsequently, the cluster-based encoding optimizer 260 generates the global convex hull 290 based on the media encode points 280. In general, for the source media sequence 122, each of the media encode points 280 included in the global convex hull 290 minimizes the overall bitrate for a different overall distortion level. The cluster-based encoding optimizer 260 then generates the cluster encoding recipes 280(0)-280(N) included in the cluster encoding recipe set 270 based on the media encode points 380 included in the global convex hull 290 and respectively, the target metric values 142(0)-142(N).

To generate the cluster encoding recipe 280(t) the cluster-based encoding optimizer 260 selects the media encode point 380 included in the global convex hull 290 that has a metric value that lies closest to the target metric value 142(t). The target metric value 142(t) may be a target bitrate 332(t), a target quality score 334(t), or a target distortion level 336(t), to name a few. The cluster-based encoding optimizer 260 then selects the shot encode list 382 included in the selected media encode point 380. For each shot encode point 320(1)-320(C), the encoding optimizer 230 adds the associated encoding points 242 to the cluster encoding recipe 280(t). A detailed example of how the cluster-based encoding optimizer 260 selects the media encode points 380 that optimize the target metric values 142 is described in conjunction with FIG. 6.

Figure 4:
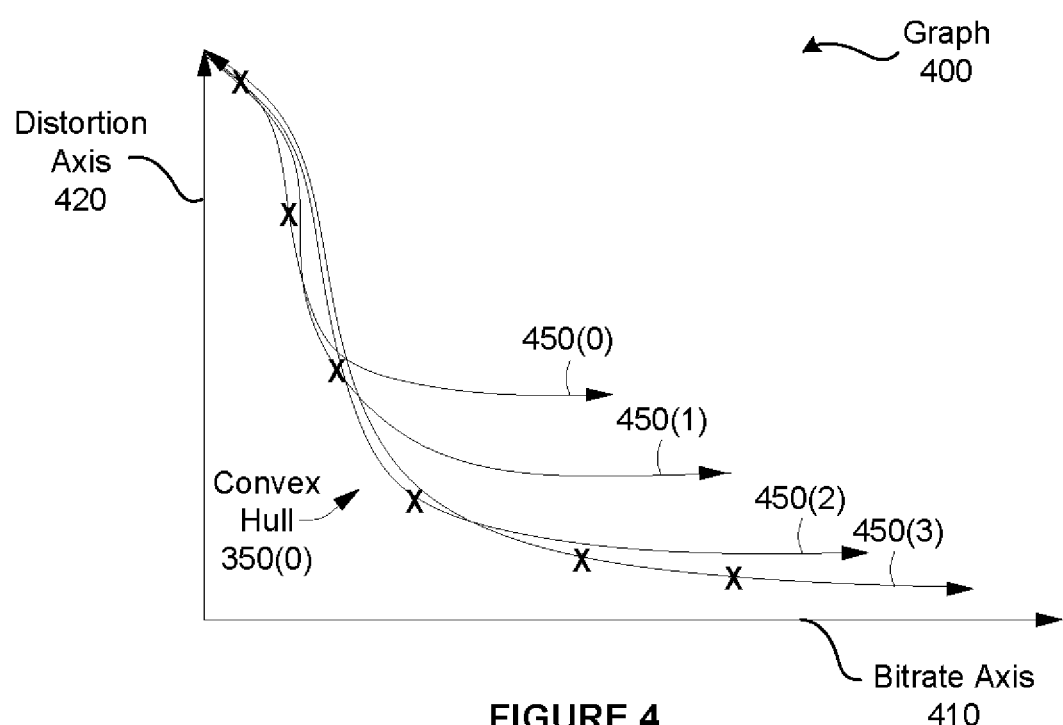
FIG. 4 illustrates an exemplary convex hull that is generated by the convex hull generator of FIG. 3, according to various embodiments of the present invention.

FIG. 4 illustrates an exemplary convex hull 350(0) that is generated by the convex hull generator 340 of FIG. 3, according to various embodiments of the present invention. In particular, the distortion curve generator 330 and the convex hull generator 340 generate the convex hull 350(0) based on the shot encode set 310(0). As shown, a graph 400 includes, without limitation, a bitrate axis 410 and a distortion axis 420.

In operation, the distortion curve generator 330 distributes the shot encode points 320 included in the shot encode set 310(0) into different subsets based on the resolution 322. Subsequently, for each resolution-specific subset, the distortion curve generator 330 plots each of the shot encode points 320 by locating the bitrate 332 along the bitrate axis 410 and the distortion level 336 along the distortion axis 420 to generate a corresponding distortion curve 450. In this fashion, the distortion curve generator 330 generates the distortion curves 450(0)-450(3), where each of the distortion curves 450 corresponds to a different resolution 322 and includes one or more shot encode points 320.

After the distortion curve generator 330 generates the distortion curves 450, the convex hull generator 340 evaluates the shot encode points 320 along the distortion curves 450 to determine the convex hull 350(0). More specifically, the convex hull generator 340 identifies the shot encode points 320 across all the distortion curves 450 that form a boundary where all the shot encode points 320 reside on one side of the boundary (in this case, the right side of the boundary) and also are such that connecting any two consecutive identified shot encode points 320 with a straight line leaves all remaining shot encode points 320 on the same side. The convex hull 350(0) includes the set of the identified shot encode points 320.

Persons skilled in the art will understand that many techniques for generating convex hulls are well known in the field of mathematics, and all such techniques may be implemented to generate the convex hulls 350. In one embodiment, the convex hull generator 340 applies machine-learning techniques to estimate the shot encode points 320 included in the convex hull 350 based on various parameters of the associated source media sequence 122. In this manner, some of the computations discussed thus far may be streamlined and/or avoided entirely.

FIGS. 5A-5D are more detailed illustrations of how the trellis iterator 360 of FIG. 3 generates the media encode points 380 based on the shot encode points 320, according to various embodiments of the present invention. As shown in FIGS. 5A-5D, the sequence trellis 370 includes, without limitation, a shot axis 520 and the bitrate axis 410. The sequence trellis 370 also includes, without limitation, columns of the shot encode points 320 included in the convex hulls 350, where each column corresponds to a particular representative shot sequence 254. For example, the zeroth column included in the sequence trellis 370 corresponds to the shot encode points 320 included in the convex hull 350(0). The shot encode points 320 included in any column are ranked according to ascending bitrate 332 (and, by construction, descending distortion levels 336). The "hull" shot encode points 320 included in any column are also guaranteed to have negative slopes that—in magnitude—are decreasing as a function of the bitrate 332.

For convenience, the hull shot encode points 320 are individually indexed according to the following system. For a given hull shot encode point 320, the first number is an index of the representative shot sequence 254, and the second number is an index into the bitrate ranking of those hull shot encode points 320. For example, the hull shot encode point 320 00 corresponds to the zeroth representative shot sequence 254(0) and the zeroth ranked bitrate 332. Similarly, the hull shot encode point 320 43 corresponds to the fourth representative shot sequence 254(4) and the third-ranked bitrate 332 (in this case the highest ranked bitrate 332).

As previously described in conjunction with FIG. 3, each hull shot encode point 320 included within the sequence trellis 370 includes a different encoded shot sequence 326. The trellis iterator 360 generates the encoded cluster sequences 386 by combining the hull shot encode points 320 based on properties of the associated encoded shot sequences 326. The trellis iterator 360 implements the sequence trellis 370 to iteratively perform this combining technique. In alternate embodiments, the trellis iterator 360 may combine the hull shot encode points 320 based on any associated properties (e.g., the bitrates 332, the quality scores 334, and/or the distortion levels 336) of the encoded shot sequences 326 without the encoded shot sequences 326 themselves.

Figure 5A:
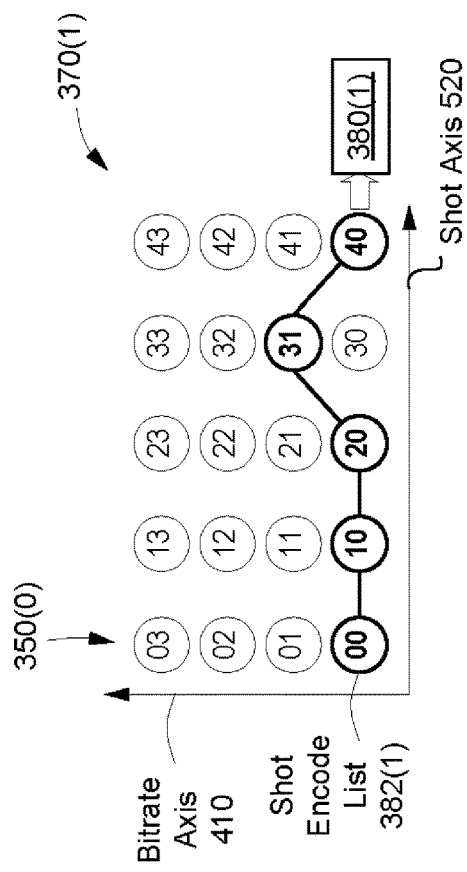
FIGS. 5A-5D are more detailed illustrations of how the trellis iterator of FIG. 3 generates media encode points based on shot encode points, according to various embodiments of the present invention.
Figure 5B:
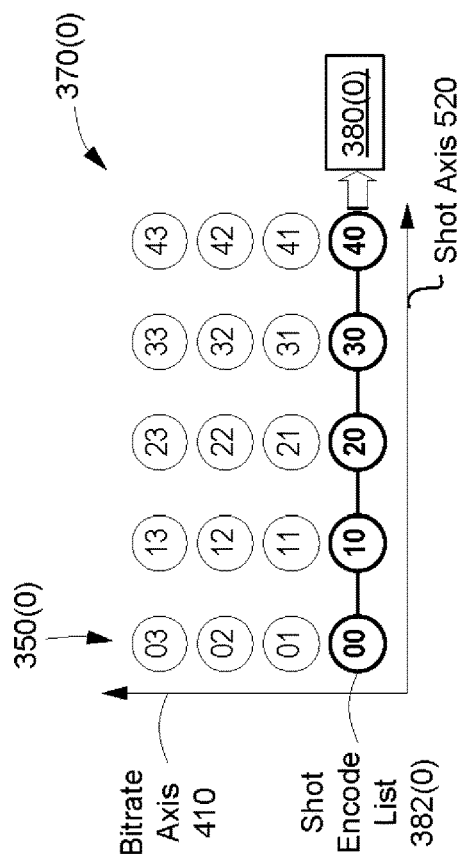

Each of FIGS. 5A-5D illustrates a different version of the sequence trellis 370 generated by the trellis iterator 360 at a different iteration. FIG. 5A illustrates the sequence trellis 370(0) in an initial state. Here, the trellis iterator 360 generates the shot encode list 382(0) that includes the hull shot encode points 320 00, 10, 20, 30, and 40. These initially selected hull shot encode points 320 have the lowest bitrate 332 and highest distortion levels 336, and therefore reside at the bottom of the respective columns.

Subsequently, the trellis iterator 360 computes the bitrate 332 and the distortion level 336 associated with the shot encode list 382(0) based on the shot encode points 320 included in the shot encode list 382(0) and the frame counts 256. The trellis iterator 360 may compute the bitrate 332 and the distortion level 336 associated with the shot encode list 382(0) in any technically feasible fashion. The trellis iterator 360 then generates the media encode point 380(0) that includes, without limitation, the shot encode list 382(0), the bitrate 332 associated with the shot encode list 382(0), and the distortion level 336 associated with the shot encode list 382(0).

The trellis iterator 360 then computes, for each hull shot encode point 320 within the shot encode list 382(0), the rate of change of distortion with respect to bitrate 332 between the hull shot encode point 320 and the above-neighbor of the hull shot encode point 320. For example, the trellis iterator 360 could compute the rate of change of distortion with respect to bitrate 332 between nodes 00 and 01, 10 and 11, 20 and 21, 30 and 31, and 40 and 41. Notably, the computed rate of change for the hull shot encode point 320 that includes a particular encoded shot sequence 326 represents the derivative of the distortion curve 450 associated with that shot sequence 132, taken at the hull shot encode point 320.

The trellis iterator 360 selects the derivative having the greatest magnitude, and then selects the above neighbor associated with that derivative for inclusion in a subsequent shot encode list 382. For example, in FIG. 5B, the trellis iterator 360 determines that the derivative associated with hull shot encode point 320 30 is greatest, and therefore includes hull shot encode point 320 31 (the above-neighbor of hull shot encode point 320 30) in the shot encode list 382(1). In particular, as shown, the trellis iterator 360 generates the shot encode list 382(1) that includes the hull shot encode points 320 00, 10, 20, 31, and 40.

The trellis iterator 360 then computes the bitrate 332 and the distortion level 336 associated with the shot encode list 382(1) based on the shot encode list 382(1) and the frame counts 256 included in the clusters 252. In some embodiments, the trellis iterator 360 selects the encoded shot sequences 326 included in, sequentially, the hull shot encode points 00, 10, 20, 31, and 40. Subsequently, the trellis iterator 360 computes the bitrate 332 and the distortion level 336 associated with the shot encode list 382(1) based on the cluster durations, the cluster total bit counts, and the cluster total distortions associated with the shot encode points 320 included in the shot encode list 382(1). The trellis iterator 360 then generates the media encode point 380(1) that includes, without limitation, the shot encode list 382(1), the bitrate 332 associated with the shot encode list 382(1), and the distortion level 336 associated with the shot encode list 382(1).

Figure 5C:
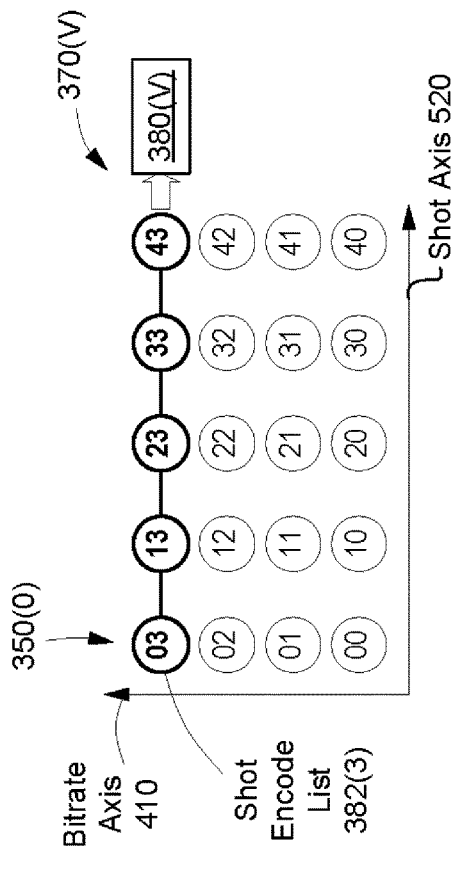
Figure 5D:
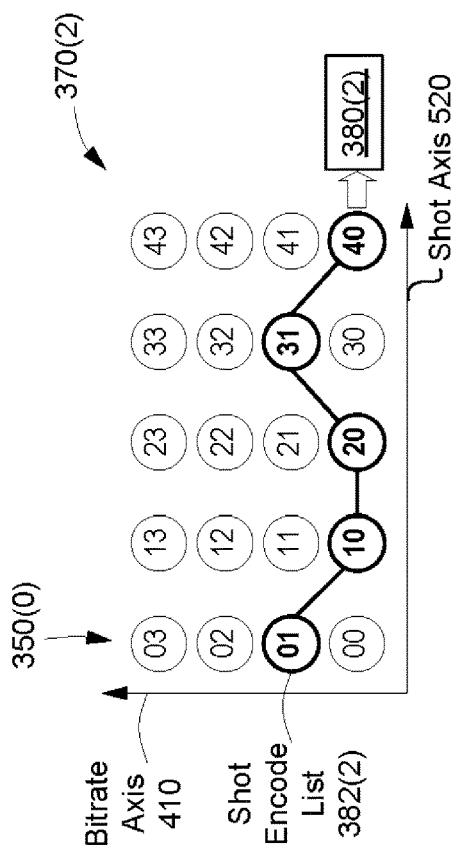

The trellis iterator 360 performs this technique iteratively, thereby ascending the sequence trellis 370, as shown in FIGS. 5C-5D. In FIG. 5C, the trellis iterator 360 determines that the derivative associated with the hull shot encode point 320 00 is greatest compared to other derivatives, and therefore selects the hull shot encode point 320 01 for inclusion in the shot encode list 382(2). As shown, the trellis iterator 360 generates the shot encode list 382(2) that includes the hull shot encode points 320 01, 10, 20, 31, and 40.

The trellis iterator 360 then computes the bitrate 332 and the distortion level 336 associated with the shot encode list 382(2) based on the shot encode list 382(2) and the frame counts 256 included in the clusters 252. The trellis iterator 360 then generates the media encode point 380(2) that includes, without limitation, the shot encode list 382(2), the bitrate 332 associated with the shot encode list 382(2), and the distortion level 336 associated with the shot encode list 382(2).

The trellis iterator 360 continues this process until, as shown in FIG. 5D, generating the media encode point 380(T). The media encode point 380(T) includes, without limitation, the shot encode list 382(T), the bitrate 332 associated with the shot encode list 382(T), and the distortion level 336 associated with the shot encode list 382(T).

In this manner, the trellis iterator 360 incrementally improves the shot encode list 382 by selecting a single hull shot encode point 320 for which bitrate is increased and distortion is decreased, thereby generating a collection of shot encode lists 382 associated with increasing bitrate and decreasing distortion.

In one embodiment, the trellis iterator 360 adds hull shot encode points 320 prior to ascending the sequence trellis 370 in order to create a terminating condition. In doing so, the trellis iterator 360 may duplicate hull shot encode points 320 having the greatest bitrate 332 to cause the rate of change between the second to last and the last hull shot encode points 320 to be zero. When this zero rate of change is detected for all the shot sequences 132, i.e., when the maximum magnitude of rate of change is exactly zero, the trellis iterator 360 identifies the terminating condition and stops iterating.

Figure 6:
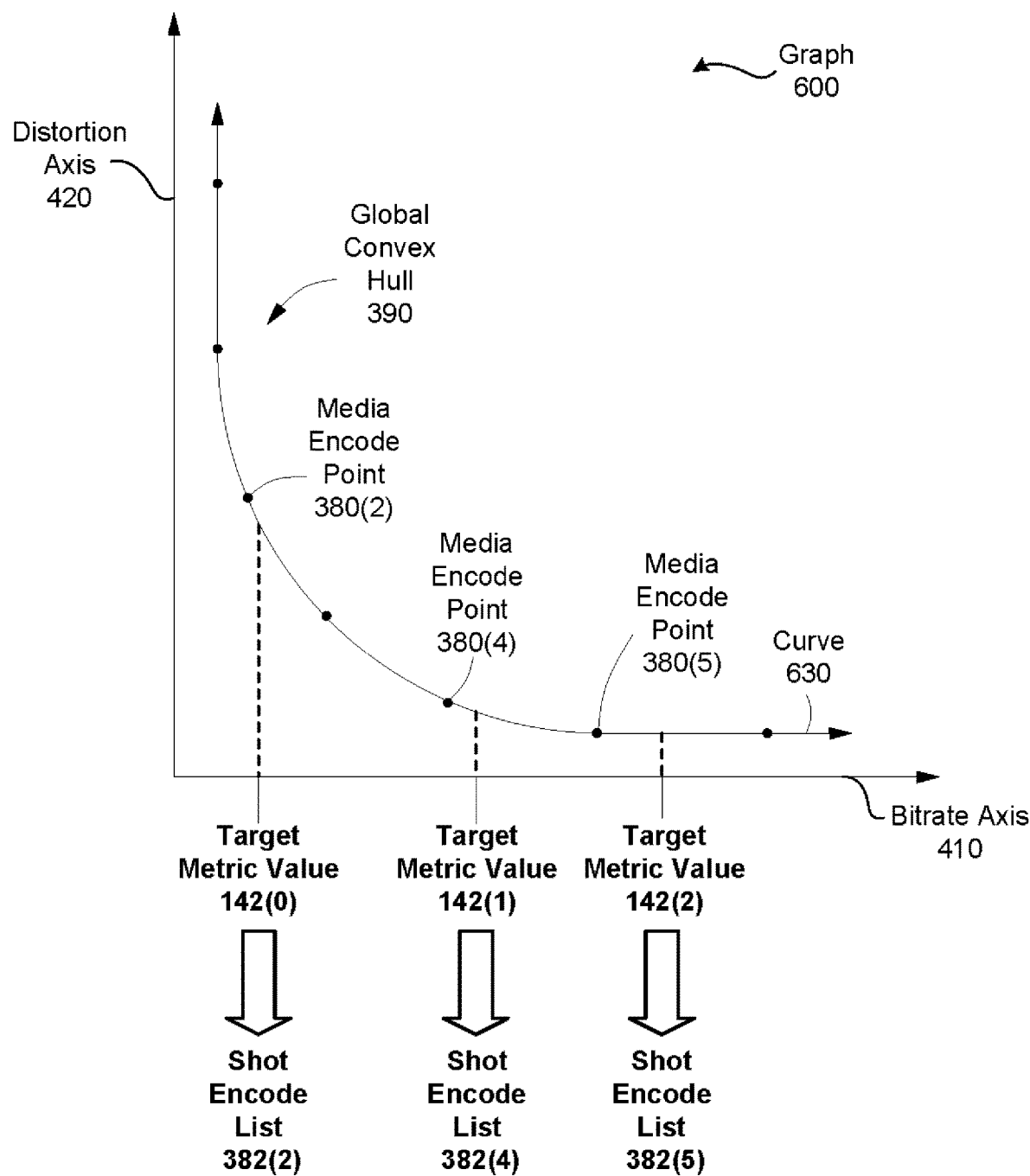
FIG. 6 illustrates an exemplary global convex hull that is generated by the cluster-based encoding optimizer of FIG. 2, according to various embodiments of the present invention.

FIG. 6 illustrates an exemplary global convex hull 390 that is generated by the cluster-based encoding optimizer 320 of FIG. 2, according to various embodiments of the present invention. More specifically, the cluster-based encoding optimizer 320 generates the global convex hull 390 shown in FIG. 6 using the media encode points 380 shown in FIGS. 5A-5D. As shown, a graph 600 includes the bitrate axis 410 and the distortion axis 420.

As described in detail in conjunction with FIGS. 5A-D, the trellis iterator 360 generates the shot encode lists 382 in an ascending manner to reduce the distortion level 336 and increase the bitrate 332. Consequently, the shot encode lists 382 span a range from high distortion level 336 and low bitrate 332 to low distortion level 336 and high bitrate 332. Among other things, each of the media encode points 380(x) includes the bitrate 332 associated with the shot encode list 382(x) and the distortion level 336 associated with the shot encode list 382(x).

As shown, the cluster-based encoding optimizer 260 plots the different media encode points 380 against the bitrate axis 410 and the distortion axis 420, to generate the global convex hull 390. The cluster-based encoding optimizer 260 then connects the points (i.e., the media encode points 380) included in the global convex hull 390 to generate a curve 630. Accordingly, the curve 630 represents the distortion level 336 as a function of the bitrate 332 across all the shot encode lists 382.

In general, based on the curve 630, the cluster-based encoding optimizer 260 can select, for a given bitrate 332, the media encode point 380 that includes the shot encode list 382 that minimizes the distortion level 336. Conversely, the cluster-based encoding optimizer 260 can select, for a given distortion level 336, the media encode point 380 that includes the shot encode list 382 that minimizes the bitrate 332 for the given distortion level 336.

In operation, the cluster-based encoding optimizer 260 selects the "optimized" media encode points 380 based on, respectively, the target metric values 142(0)-142(N). The target metric value 142(t) may be a target bitrate 332(t), a target quality score 334(t), or a target distortion level 336(t), to name a few. In the embodiment depicted in FIG. 6, the target metric value 142(t) is a target bitrate 332(t). Accordingly, the cluster-based encoding optimizer 260 selects the optimized media encode point 380 that includes the shot encode list 382 having the bitrate 332 that lies closest to the target metric value 142(t).

As shown, based on the target metric value 142(0), the cluster-based encoding optimizer 260 selects the optimized media encode point 380(2). Notably, the media encode point 380(2) specifies how to encode each of the shot sequences 132 to generate the target encoded media sequence 180(0) that minimizes the distortion level 336 for the target bitrate 332(0). In alternate embodiments, the cluster-based encoding optimizer 260 selects the optimized media encode point 380 that includes the quality score 334 or the distortion level 336 that lies closest to the target metric value 142(0). Notably, the optimized media encode point 380(2) also includes the "optimized" shot encode list 382(2).

In a similar fashion, the cluster-based encoding optimizer 260 selects the optimized media encode point 380(4) based on the target metric value 142(1). In addition, the cluster-based encoding optimizer 260 selects the optimized media encode point 380(5) based on the target metric value 142(2). Subsequently, as described previously in conjunction with FIG. 2, the cluster-based encoding optimizer 260 generates the cluster encoding recipe set 270.

Figure 7:
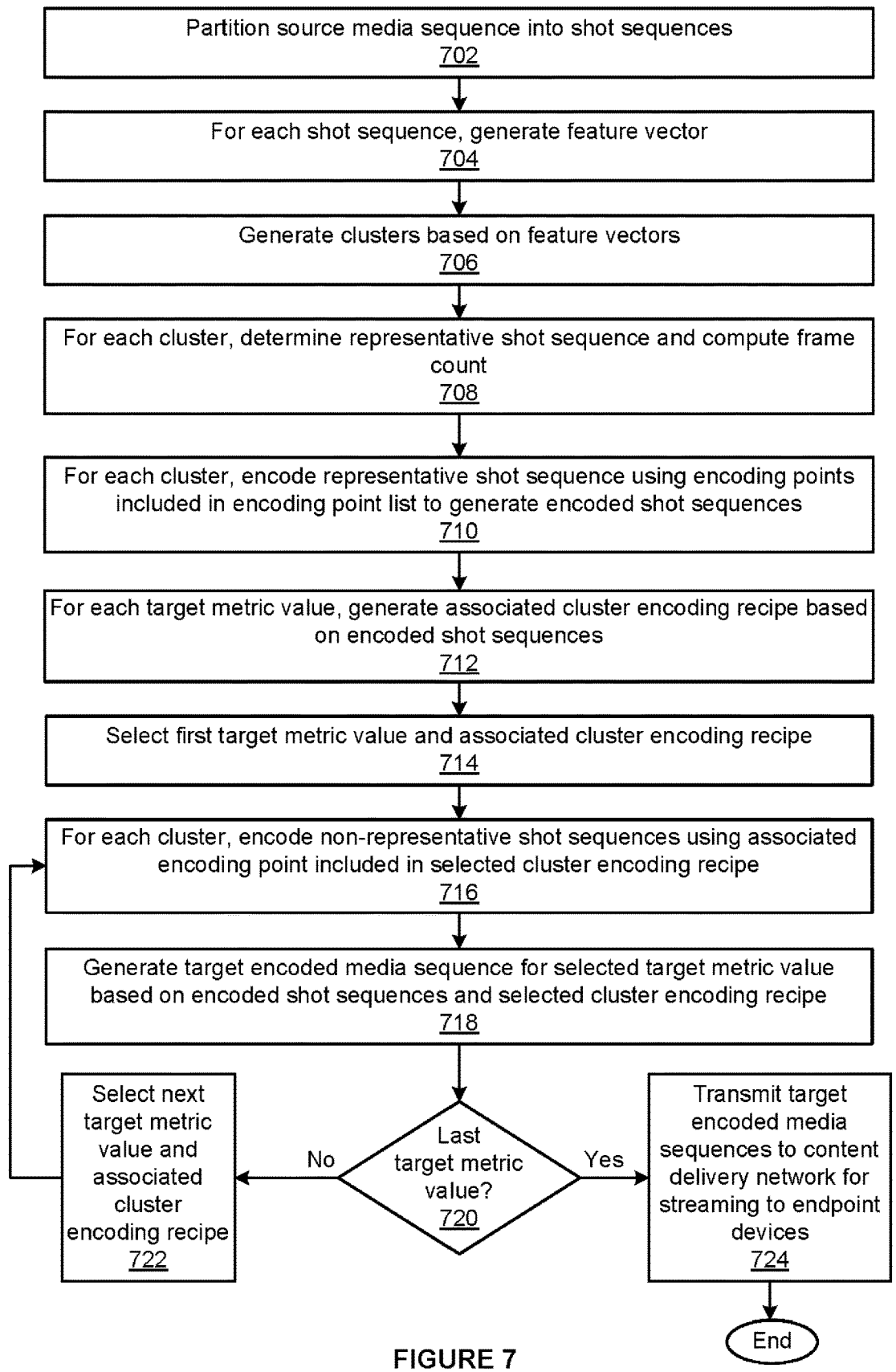
FIG. 7 is a flow diagram of method steps for encoding a source media sequence based on shot sequence features, according to various embodiments of the present invention.

FIG. 7 is a flow diagram of method steps for encoding a source media sequence based on shot sequences features, according to various embodiments of the present invention. Although the method steps are described with reference to the systems of FIGS. 1-8, persons skilled in the art will understand that any system configured to implement the method steps, in any order, falls within the scope of the present invention.

As shown, a method 700 begins a step 702, where the shot analyzer 128 partitions the source media sequence 122 into the shot sequences 132. At step 704, for each of the shot sequences 132(x), the feature extractor 210 generates the feature vector 222(x) included in the feature dataset 220. At step 706, the shot classifier 230 partitions the shot sequences 132 into the clusters 252 based on the feature vectors 222. At step 708, for each cluster 252(x), the shot classifier 230 determines the representative shot sequences 254(x) and computes the frame count 256(x) based on the shot sequences 132 assigned to the cluster 252(x).

At step 710, for each cluster 252(x), the cluster-based encoding optimizer 260 encodes the representative shot sequence 254(x) using the encoding points 242 included in the encoding list 210 to generate associated encoded shot sequences 326. At step 712, for each target metric value 142(t), the cluster-based encoding optimizer 260 generates the associated cluster encoding recipe 280(t) based on the encoded shot sequences 326 derived from the representative shot sequences 254. The cluster-based encoding optimizer 260 may generate the cluster encoding recipes 280 in any technically feasible fashion. For instance, in some embodiments, the cluster-based encoding optimizer 260 may perform convex hull operations to generate the cluster encoding recipes 280.

At step 714, the cluster-based assembly engine 290 selects the target metric value 142(1) and the associated cluster encoding recipe 280(1). At step 716, for each cluster 252(x), the cluster-based assembly engine 290 encodes the non-representative shot sequences 132 assigned to the cluster 252(x) using the encoding point 242(x) included in the selected cluster encoding recipe 280 to generate new encoded shot sequences 326. In alternate embodiments, as part of step 716, the cluster-based assembly engine 290 refines any number of the encoding points 242 included in the selected cluster encoding recipe 280 based on differences of features within each cluster 252. At step 718, the cluster-based assembly engine 290 generates the target encoded media sequence 180 associated with the selected target metric value 142 based on the encoded shot sequences 326 and the selected cluster encoding recipe 280.

At step 720, the cluster-based assembly engine 290 determines whether the selected target metric value 142 is the last target metric value 142. If, at step 720, the cluster-based assembly engine 290 determines that the target metric value 142 is not the last target metric value 142, then the method 700 proceeds to step 722. At step 722, the cluster-based assembly engine 290 selects the next target metric value 142 and the associated cluster encoding recipe 280. The method 700 then returns to step 716, where the cluster-based assembly engine 290 generates the target encoded media sequence 180 associated with the newly selected target metric value 142.

If, however, at step 720, the cluster-based assembly engine 290 determines that the target metric value 142 is the last target metric value 142, then the method 700 proceeds directly to step 724. At step 724, the sequence-based encoding application 140 transmits the target encoded media sequences 180 to the content delivery network 190 for streaming to endpoint devices. The method 700 then terminates.

Advantageously, the cluster-based encoding optimizer 260 optimizes the encoding points 242 per cluster 252 instead of per shot sequence 132. Consequently, the total number of encoded shot sequences 326 that the cluster-based encoding optimizer 260 generates and evaluates is the product of the number of clusters 252 and the number of encoding points 242. By contrast, in conventional sequence-based encoding techniques, the total number of encoded shot sequences generated and evaluated is the product of the number of shot sequences 154 and the number of encoding points 242.

In some embodiments, the cluster-based encoding optimizer 260 implements iterative techniques in which the cluster-based encoding optimizer 260 repeatedly generates the convex hull 290. More specifically, the cluster-based encoding optimizer 260 initially generates a relatively sparse encoding point list 210. The cluster-based encoding optimizer 260 generates the convex hull 290 based on the encoding point list 210, generates additional encoding points 242 based on the convex hull 290, and adds the additional encoding points 242 to the encoding point list 210. The cluster-based encoding optimizer 260 continues to re-generate the convex hull 290 based on the expanded encoding point list 210 and then add additional encoding points to the encoding point list 210 based on the re-generated convex hull 290 until a desired convergence criteria is reached. Finally, the cluster-based encoding optimizer 260 generates the cluster encoding recipe set 270 based on the most recently generated convex hull 290.

In alternate embodiments, the sequence-based encoding application 140 and/or the cluster-based encoding optimizer 260 may implement any number of complexity-reducing techniques in any combination. For instance, in various embodiments, the sequence-based encoding application 140 implements both feature-based encoding and pre-encoding (described below in conjunction with FIGS. 8-10), and the sequence-based encoding application 140 is modified based on the techniques described in conjunction with FIGS. 2-10.

Optimizing Encoding Recipes Based on Pre-Encoded Shot Sequences

Figure 8:
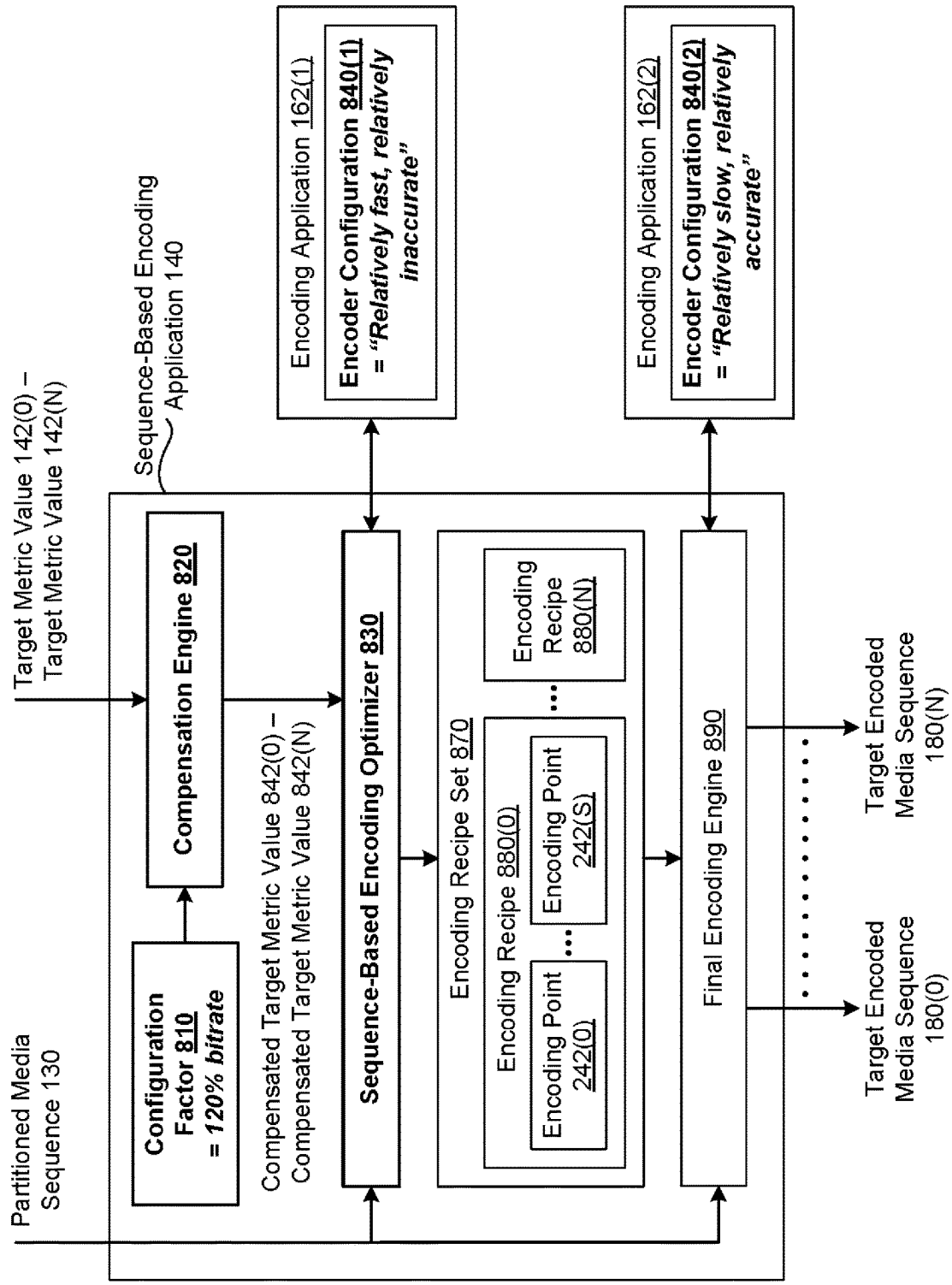
FIG. 8 is a more detailed illustration of the sequence-based encoding application of FIG. 1, according to other various embodiments of the present invention.

FIG. 8 is a more detailed illustration of the sequence-based encoding application 140 of FIG. 1, according to other various embodiments of the present invention. The sequence-based encoding application 140 includes, without limitation, a configuration factor 810, a compensation engine 820, a sequence-based encoding optimizer 830, an encoding recipe set 870, and a final encoding engine 890.

In general, the encoding application 162 includes one or more configuration settings that vary a tradeoff between speed and quality associated with encoding media content. For instance, in some embodiments, the encoding application 162 implements the VP9 codec. The VP9 codec includes a numerical "speed" setting, where 0 is associated with the slowest encoding speed and the highest quality encoded content. The configuration factor 810 represents the impact of varying the configuration settings between a "fast" configuration and a "slow" configuration. More precisely, the configuration factor 810 represents a degradation in the media metric attributable to using a given encoding point 242 and the fast configuration instead of the encoding point 242 and a slow configuration.

For explanatory purposes only, FIG. 8 depicts the configuration factor 810 of a 120% increase in the bitrate 332 between an encoder configuration 840(2) that is relatively slow and relatively accurate and the encoding configuration 840(2) this is relatively fast and relatively inaccurate. The configuration factor 810 may be determined in any technically feasible fashion. For example, the configuration factor 810 could be generated based on historical encoding statistics.

The compensation engine 820 modifies the target metric values 142(0)-142(N) based on the configuration factor 810 to generate, respectively, compensated target metric values 842(0)-842(N). More specifically, the compensation engine 820 sets the compensated target metric value 842($x$) equal to the product of the configuration factor 810 and the target metric value 142($x$). In alternate embodiments, the compensation engine 820 may compute the compensated target metric values 842 in any technically feasible fashion.

The sequence-based encoding application 140 configures a first instance of the encoding application 162(1) to implement the encoder configuration 840(1) that is relatively fast and relatively inaccurate. The sequence-based encoding application 140 then configures the sequence-based encoding optimizer 830 to compute the encoding recipe set 870 based on the partitioned media sequence 130, the compensated target metric values 842 and the encoding application 162(1). As described in conjunction with FIG. 9, the functionality of the sequence-based encoding optimizer 830 is analogous to the functionality of the cluster-based encoding optimizer 260 described in conjunction with FIGS. 2-6.

In alternate embodiments, the sequence-based encoding optimizer 830 may be configured to compute the encoding recipe set 870 using the partitioned media sequence 130, the compensated target metric values 842 and the encoding application 162(1) in any technically feasible fashion. For instance, in some embodiments, the compensation engine 820 is included in the sequence-based encoding optimizer 830 instead of the sequence-based encoding application 140, and the sequence-based encoding optimizer 830 configures the encoding application 162(1) to implement the encoder configuration 840(1).

The encoding recipe set 870 describes how to generate different target encoded media sequences 180. As shown, the encoding recipe set 870 includes, without limitation, encoding recipes 880(0)-880(N). Each encoding recipe 880($x$) is associated with a different target metric value 142($x$) and includes, without limitation, a different encoding point 242 for each of the shot sequences 132. Together, the encoding points 242 included in the encoding recipe 880($x$) specify how to encode the shot sequences 132 to generate the target encoded media sequence 180($x$) that is optimized for the target metric value 142($x$).

Subsequently, the sequence-based encoding application 140 configures a second instance of the encoding application 162(2) to implement the encoder configuration 840(2) that is relatively slow and relatively accurate. The sequence-based encoding application 140 then configures the final encoding engine 890 to generate the target encoded media sequences 180 based on the partitioned media sequence 130, the encoding recipe set 870, and the encoding application 162(2).

Figure 9:
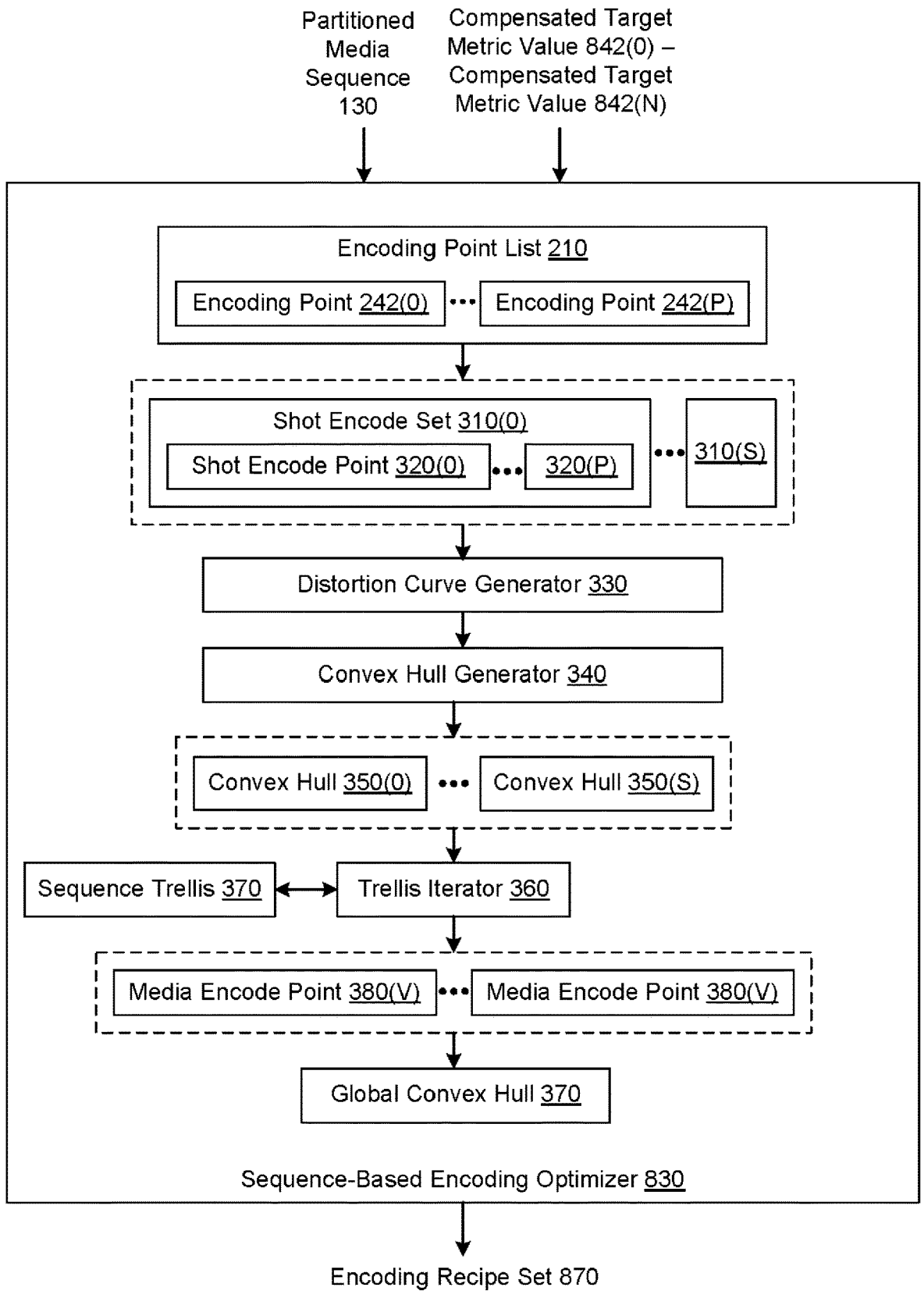
FIG. 9 is a more detailed illustration of the sequence-based encoding optimizer of FIG. 8, according to other various embodiments of the present invention.

For each encoding recipe 880($t$), the final encoding engine 890 re-encodes each of the shot sequences 132($y$) using the associated encoding point 242($y$) included in the encoding recipe 880($t$) and the encoding application 162(2). In this fashion, the final encoding engine 890 generates relatively high quality encoded shot sequences 326. The encoding engine 890 then combines a different relatively high quality encoded shot sequences 326 for each shot sequence 132 as per the encoding recipe 880($x$) to generate the target encoded media sequence 180($t$). In alternate embodiments, the final encoding engine 890 may generate the target encoded media sequences 180 in any technically feasible fashion. Subsequently, the final encoding engine 890 transmits the target encoded media sequences 180 to the CDN 190 for distribution to endpoint devices FIG. 9 is a more detailed illustration of the sequence-based encoding optimizer 830 of FIG. 8, according to other various embodiments of the present invention. As shown, the sequence-based encoding optimizer 830 includes, without limitation, the encoding point list 210, the shot encode sets 310, the distortion curve generator 330, the convex hull generator 340, the convex hulls 350, the trellis iterator 360, the sequence trellis 370, the media encode points 380, and the global convex hull 390. The total number of the shot encode sets 310 and the total number of the convex hulls 350 are both equal to the number of shot sequences 132 included the partitioned video sequence 130. In general, the shot sequence 132(x) is associated with the shot encode set 310(x) and the convex hull 350(x).

Notably, the sequence-based encoding optimizer 830 is a degenerate version of the cluster-based encoding optimizer 260 of FIG. 2. Namely, if the number of clusters 252 is equal to the number of shot sequences 132, then the global convex hull 290 generated by the cluster-based encoding optimizer 260 matches the global convex hull 290 generated by the sequence-based encoding optimizer 820. Similarly, the cluster encoding recipe set 270 generated by the cluster-based encoding optimizer 260 matches the encoding recipe set 270 generated by the sequence-based encoding optimizer 230. Although some simplifications will be apparent to those of ordinary skill in the art, the encoding point lists 210, the shot encode sets 310, the distortion curve generator 330, the convex hull generator 340, the convex hulls 350, the trellis iterator 360, the sequence trellis 370, the media encode points 380, and the global convex hull 390 are described previously herein in conjunction with FIGS. 2-7. Further the techniques implemented in the sequence-based encoding optimizer 830 are simplified versions of the techniques implemented in the cluster-based encoding optimizer 260 as described previously herein in conjunction with FIGS. 2-7.

Figure 10:
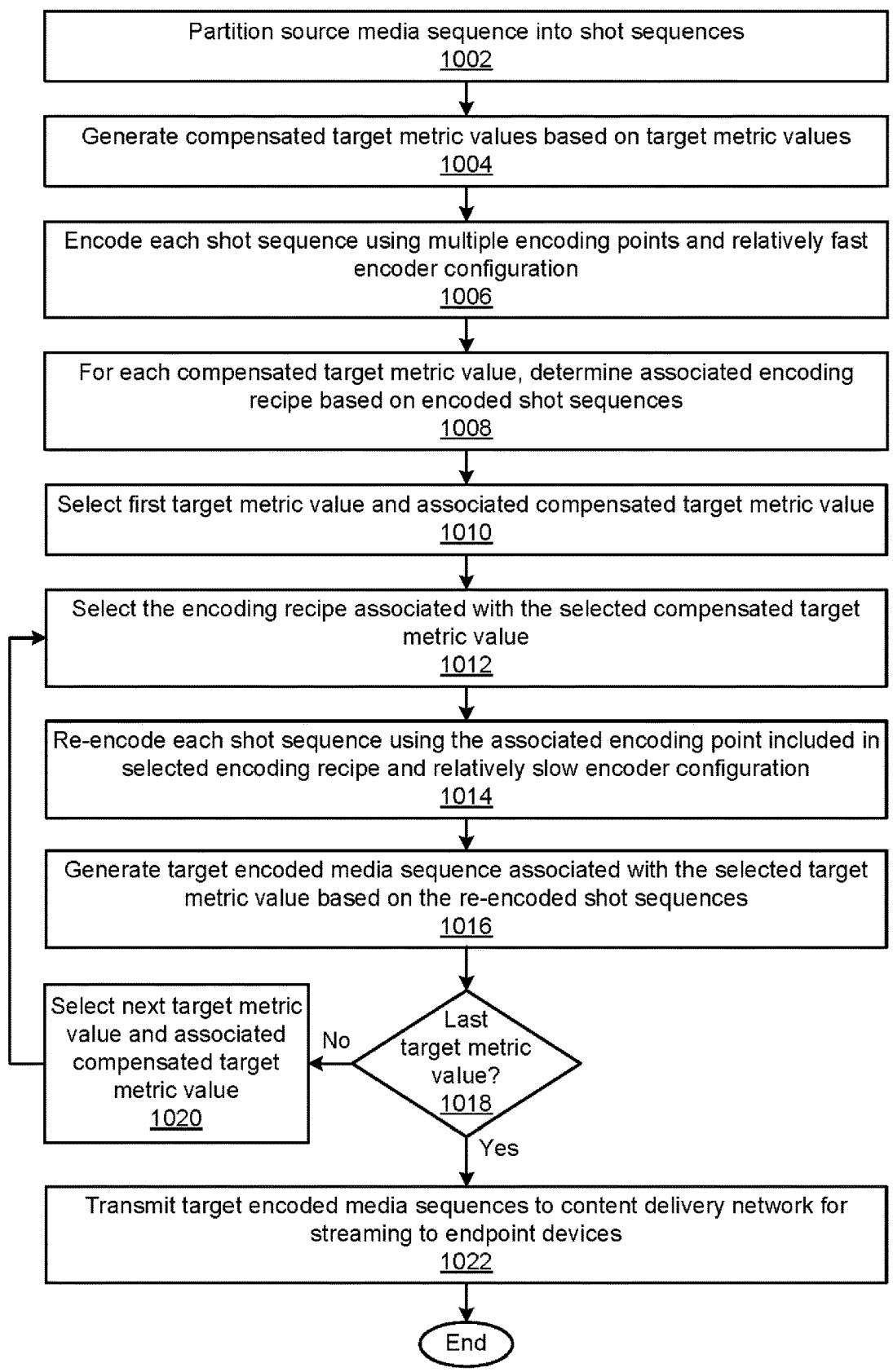
FIG. 10 is a flow diagram of method steps for encoding a source media sequence using encoding points that are based on a different encoder configuration, according to various embodiments of the present invention.

FIG. 10 is a flow diagram of method steps for encoding a source media sequence using encoding points that are based on a different encoder configuration, according to various embodiments of the present invention. Although the method steps are described with reference to the systems of FIGS. 1 and 8-9, persons skilled in the art will understand that any system configured to implement the method steps, in any order, falls within the scope of the present invention.

As shown, a method 1000 begins a step 1002, where the shot analyzer 128 partitions the source media sequence 122 into the shot sequences 132. At step 1004, the compensation engine 820 generates compensated target metric values 842 based on the target metric values 142 and the configuration factor 810. At step 1006, for each shot sequence 132(x), the sequence-based encoding optimizer 830 encodes the shot sequence 132(x) using the encoding points 242 included in the encoding point list 210 and the relatively fast encoder configuration 840(1) to generate the associated encoded shot sequences 326. At step 1008, for each compensated target metric value 842(t), the sequence-based encoding optimizer 830 generates the associated encoding recipe 880(t) based on the encoded shot sequences 326. The sequence-based encoding optimizer 830 may generate the encoding recipes 880 in any technically feasible fashion. For instance, in some embodiments, the sequence-based encoding optimizer 830 may perform convex hull operations to generate the encoding recipes 880.

At step 1010, the final encoding engine 890 selects the target metric value 142(1) and the associated compensated target metric value 842(1). At step 1012, the final encoding engine 890 selects the encoding recipe 880 associated with the selected compensated target metric value 842. At step 1014, the final encoding engine 890 re-encodes each shot sequence 132(y) based on the associated encoding point 242(y) included in the selected encoding recipe 880 using the relatively slow encoder configuration 840(2) to generate the re-encoded shot sequences 326. At step 1016, the final encoding engine 890 generates the target encoded video sequence 180 associated with the selected target metric value 142 based on the re-encoded shot sequences 326 and the selected encoding recipe 880.

At step 1018, the final encoding engine 890 determines whether the selected target metric value 142 is the last target metric value 142. If, at step 1018, the final encoding engine 890 determines that the target metric value 142 is not the last target metric value 142, then the method 1000 proceeds to step 1020. At step 1020, the final encoding engine 890 selects the next target metric value 142 and the associated compensated target metric value 842. The method 1000 then returns to step 1012, where the final encoding engine 890 generates the target encoded media sequence 180 associated with the newly selected target metric value 142.

If, however, at step 1018, the final encoding engine 890 determines that the target metric value 142 is the last target metric value 142, then the method 1000 proceeds directly to step 1022. At step 1022, the sequence-based encoding application 140 transmits the target encoded media sequences 180 to the content delivery network 190 for streaming to endpoint devices. The method 1000 then terminates.

Notably, the total number of encoded shot sequences 386 that the sequence-based encoding optimizer 830 generates via the relatively fast and relatively inaccurate encoder configuration 840(1) is equal to the product of the number of the shot sequences 132 and the number of the encoding points 242. By contrast, the total number of encoded shot sequences 386 that the final encoding engine 890 generates via the relatively slow and relatively accurate is less than the product of the number of shot sequences 132 and the number of the target metric values 142. The difference in execution speed between the two encoder configurations 840 can be substantial (m; fifty times faster). As a result, generating many of the encoded shot sequences 386 using the relatively fast encoder configuration 840(1) substantially reduces the overall time required to generate the target encoded media sequences 180.

In alternate embodiments, the sequence-based encoding application 140 and/or the sequence-based encoding optimizer 830 may implement any number of complexity-reducing techniques in any combination. For instance, in various embodiments, the sequence-based encoding application 140 implements pre-encoding and includes an interpolation-based encoding optimizer instead of the sequence-based encoding optimizer 830. The interpolation-based encoding optimizer implements encoding point interpolation and is described below in conjunction with FIGS. 11-13.

Interpolating Between Encoding Points

Figure 11:
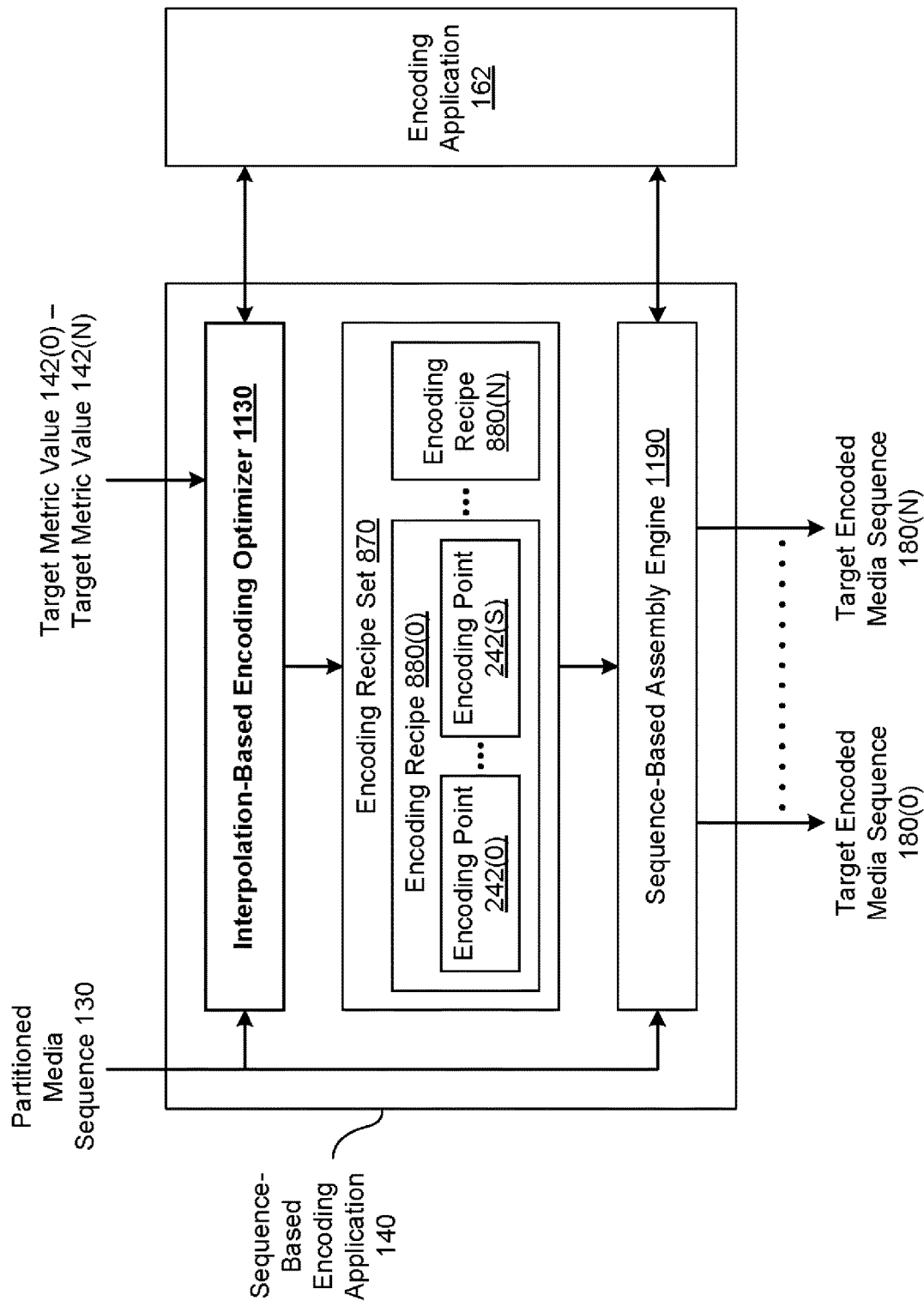
FIG. 11 is a more detailed illustration of the sequence-based encoding application of FIG. 1, according to yet other various embodiments of the present invention.

FIG. 11 is a more detailed illustration of the sequence-based encoding application 140 of FIG. 1, according to yet other various embodiments of the present invention. As shown, the sequence-based encoding application 140 includes, without limitation, an interpolation-based encoding optimizer 1130, the encoding recipe set 870, and a sequence-based assembly engine 1190. The interpolation-based encoding optimizer 1130 generates the encoding recipe set 870 based on the target metric values 142 and the partitioned media sequence 130. As described in greater detail below in conjunction with FIG. 12, the interpolation-based encoding optimizer 1130 generates "initial" shot encode points 320 associated with a portion of the encoding points 242, and generates "estimated" shot encode points 320 associated with the remaining encoding points 242. Importantly, the interpolation-based encoding optimizer 1130 does not generate the encoded shot sequences 326 for the estimated shot encode points 320. As a result, any number of the encoding points 242 included in the encoding recipe set 870 are not associated with encoded shot sequences 326.

The sequence-based assembly engine 1190 generates the target encoded media sequences 180 based on the encoding recipe set 870, the encoded shot sequences 326 generated by the interpolation-based encoding optimizer 1130, and the shot sequences 132 included in the partitioned media sequence 130. First, the sequence-based assembly engine 1190 determines which, if any, of the encoded shot sequences 326 specified in the encoding recipe set 870 do not exist. For each of the encoded shot sequences 326 that does not exist, the sequence-based assembly engine 1190 generates the encoded shot sequence 326. Subsequently, to generate the target encoded video sequence 180(*t*), the sequence-based assembly engine 1190 aggregates a different encoded shot sequence 326 for each of the shot sequences 132 as specified by the encoded recipes 880(*t*). In alternate embodiments, the sequence-based assembly engine 1190 may generate the target encoded media sequences 180 in any technically feasible fashion. Finally, the sequence-based assembly engine 1190 transmits the target encoded media sequences 180 to the CDN 190 for distribution to endpoint devices.

Figure 12:
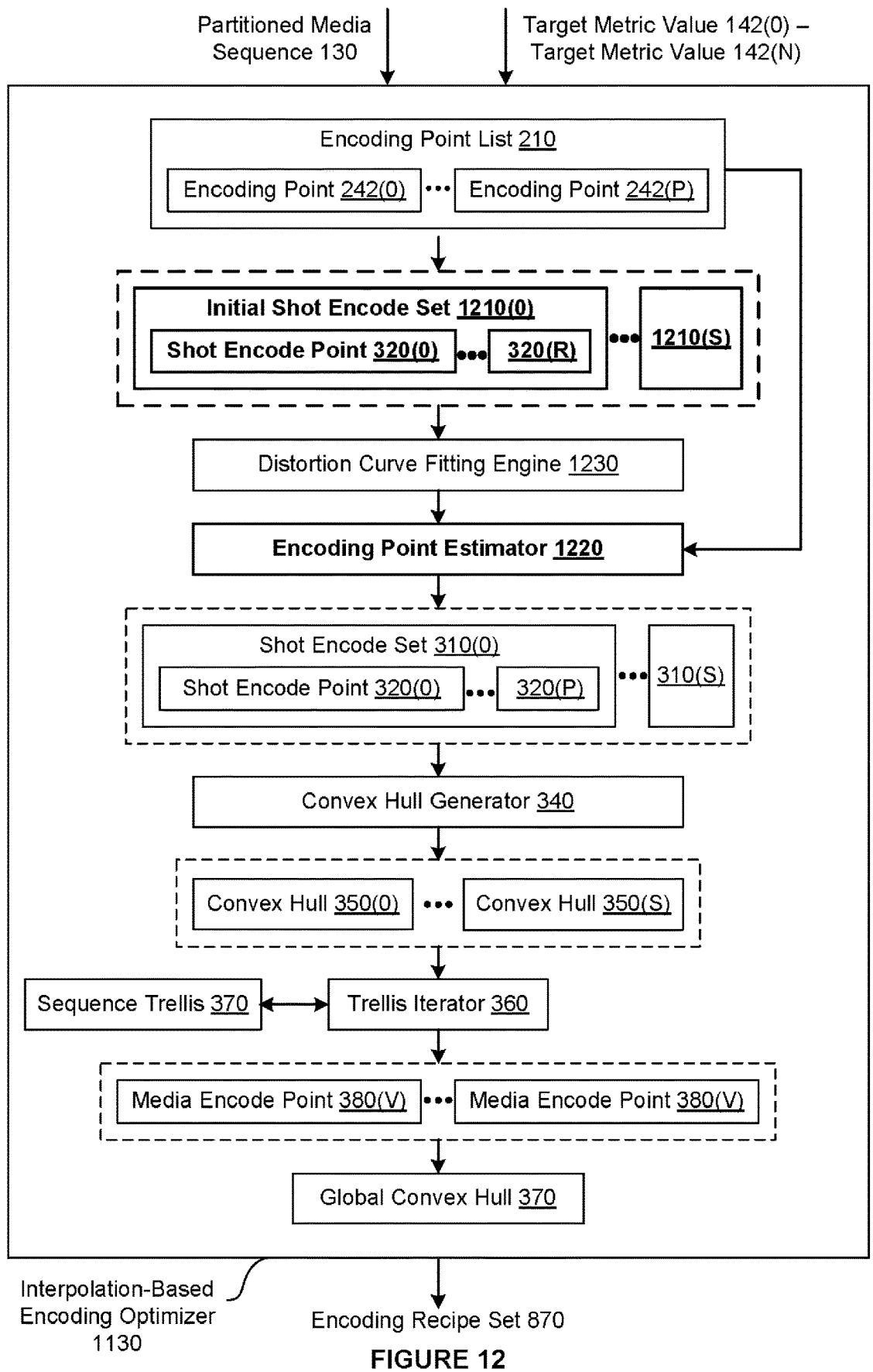
FIG. 12 is a more detailed illustration of the interpolation-based encoding optimizer of FIG. 11, according to various embodiments of the present invention.

FIG. 12 is a more detailed illustration of the interpolation-based encoding optimizer 1130 of FIG. 11, according to various embodiments of the present invention. As shown, the interpolation-based encoding optimizer 1130 includes, without limitation, the encoding point list 210, initial shot encode sets 1210, a distortion curve fitting engine 1230, an encoding point estimator 1220, the shot encode sets 310, the convex hull generator 340, the convex hulls 350, the trellis iterator 360, the sequence trellis 370, the media encode points 380, and the global convex hull 390. The total number of the shot encode sets 310 and the total number of the convex hulls 350 are both equal to the number of shot sequences 132 included in the partitioned video sequence 130. In general, the shot sequence 132(*x*) is associated with both the shot encode set 310(*x*) and the convex hull 350(*x*).

The encoding point list 210 and the generation of the encoding point list 210 was described previously herein in conjunction with FIG. 3. The interpolation-based encoding optimizer 1130 designates a portion of the encoding points 242 included in the encoding point list 210 as "initial" encoding points 242 and the remaining encoding points 242 as "estimated" encoding points 242. The interpolation-based encoding optimizer 1130 may determine which of the encoding points 242 are initial encoding points 242 in any technically feasible fashion. For instance, in some embodiments, the interpolation-based encoding optimizer 1130 selects six encoding points 242 for each resolution 322. More specifically, for each resolution 322, the encoding optimizer 1130 selects the encoding points 242 having the resolution 322 and the QP values 324 of 16, 22, 28, 34, 40, and 46. In various embodiments, the encoding optimizer 1130 may select the encoding points 242 based on statistical data indicating which of the QP values 324 are most likely to be used.

The interpolation-based encoding optimizer 1130 generates the initial shot encode sets 1210(0)-1210(S) based on the shot sequences 132 and the initial encoding points 242. Each of the initial shot encode sets 1210 includes, without limitation, R shot encode points 320, where R is the number of initial encoding points 242. Notably, for each permutation of the initial encoding points 242 and the shot sequence 132, the interpolation-based encoding optimizer 1130 generates a different encoded shot sequence 326.

For each of the shot sequences 132, the distortion curve fitting engine 1230 generates a different set of distortion curves 450 based on the initial shot encode sets 1210. To generate the distortion curves 450 associated with the shot sequence 132(*x*), the distortion curve fitting engine 1230 first distributes the shot encode points 320 included in the initial shot encode set 310(*x*) into different subsets based on the resolution 322. Subsequently, for each resolution-specific subset, the distortion curve fitting engine 1230 fits the bitrate 332 and the distortion level 336 for each of the shot encode points 320 to a cubic spline polynomial.

Subsequently, for each permutation of the shot sequences 132 and the estimated encoding points 242, the encoding point estimator 1220 generates the associated estimated shot encode point 320. To generate the estimated shot encode point 320 based on the shot sequence 132(*x*) and the estimated encoding point 242(*y*), the encoding point estimator 1220 selects the distortion curve 450 associated with both the shot sequence 132(*x*) and the resolution 322 of the encoding point 242(*y*). The encoding point estimator 1220 then performs any number and type of interpolation or extrapolation operations based on the distortion curve 450 to estimate the bitrate 322 and the distortion level 336 that the encoding point estimator 1220 includes in estimated shot encode point 320. Note that the encoding point estimator 1220 may also compute additional characteristics, such as the quality score 334, but the estimated shot encode point 320 does not include the corresponding encoded shot sequence 326.

In alternate embodiments, the distortion curve flitting engine 1230 and the encoding point estimator 1220 may perform any number and combination of curve fitting, interpolation, and extrapolation techniques in any technically feasible fashion. In various embodiments, the distortion curve fitting engine 1230 may also impose a convexity constraint on the distortion curve 450 (La, a requirement that the second derivative of the distortion curve 450 is positive). In alternate embodiments, the distortion curve fitting engine 1230 may be replaced with a quality curve generator that generates quality curves, and the techniques described herein are modified accordingly.

After generating the estimated shot encode points 320, the encoding point estimator 1220 generates the shot encode sets 310 based on the shot encode points 320 included in the initial shot encode sets 310 and the estimated shot encode points 320. The encoding point estimator 1220 also adds each of the estimated shot encode points 320 to the associated distortion curve 450. The convex hull generator 340, the trellis iterator 360, and the interpolation-based encoding application 1130 then generate the encoding recipe set 870 based on the shot encode sets 310 and the target metric values 142, without differentiating between the initial shot encode points 320 and the estimated shot encode points 320.

In alternate embodiments, the interpolation-based encoding optimizer 1130 may include a different encoding point list 210(x) for each of the shots 132(x). Further, the encoding points 242 included in the encoding list 210(x) may be different than the number of encoding points 242 included in any of the other encoding lists 210. In such embodiments, the techniques described herein are modified to reflect the shot-specific encoding point lists 210. In the same or other embodiments, the interpolation-based encoding optimizer 1130 may implement an iterative process in which the interpolation-based encoding optimizer 1130 iteratively refines the number of encoding points 242 in order to efficiently converge to the encoding recipe set 270.

In various embodiments, the sequence-based encoding application 140 and the interpolation-based encoding optimizer 1230 implement iterative techniques in which the interpolation-based encoding optimizer 1230 repeatedly generates the convex hull 290 based on a fixed number of encoding points 242. However, after each iteration, the interpolation-based encoding optimizer 1230 re-designates one or more of the estimated encoding points 242 included in the encoding recipe set 370 as an initial encoding point 242. In some embodiments, the interpolation-based encoding optimizer 1230 may stop iterating when none of the encoding points 242 included in the encoding recipe set 370 are estimated encoding points 242. In other embodiments, the interpolation-based encoding optimizer 1230 may stop iterating when a maximum number of iterations is reached.

Figure 13:
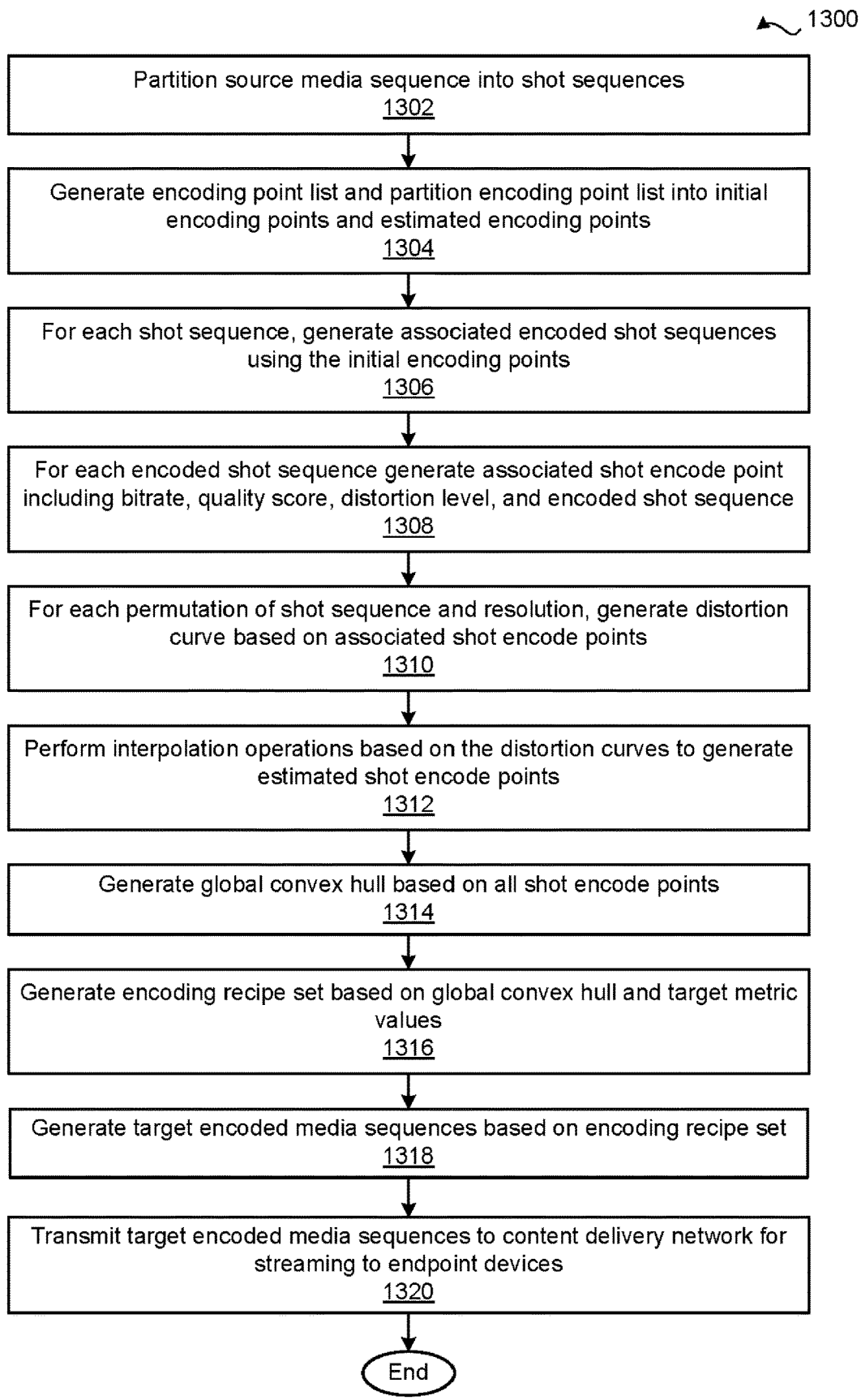
FIG. 13 is a flow diagram of method steps for encoding a source media sequence using one or more estimated encoding points, according to various embodiments of the present invention.

FIG. 13 is a flow diagram of method steps for encoding a source media sequence using one or more estimated encoding points, according to various embodiments of the present invention. Although the method steps are described with reference to the system of FIGS. 1 and 11-12, persons skilled in the art will understand that any system configured to implement the method steps, in any order, falls within the scope of the present invention.

As shown, a method 1300 begins a step 1302, where the shot analyzer 128 partitions the source media sequence 122 into the shot sequences 132. At step 1304, the interpolation-based encoding optimizer 1230 generates the encoding point list 210 and partitions the encoding points 242 included in the encoding point list 210 into initial encoding points 242 and estimated encoding points 242. At step 1306, for each shot sequence 132, the interpolation-based encoding optimizer 1230 generates associated encoded shot sequences 326 using the different initial encoding points 242. At step 1308, for each encoded shot sequence 326, the interpolation-based encoding optimizer 1230 generates the associated shot encode point 320 including the bitrate 332, the distortion level 336, the quality score 334, and the encoded shot sequence 326.

At step 1310, for each permutation of the shot sequences 132 and the resolutions 322, the distortion curve fitting engine 1230 performs curve fitting techniques based on the associated shot encode points 320 to generate the associated distortion curve 450. At step 1312, the encoding point estimator 1220 performs interpolation/extrapolation operations based on the distortion curves 450 to generate estimated shot encode points 320. At step 1314, the interpolation-based encoding optimizer 1230 generates the global convex hull 390 based on all the shot encode points 320.

At step 1316, the interpolation-based encoding optimizer 1230 generates the encoding recipe set 870 based on the global convex hull 390 and the target metric values 142. At step 1318, the sequence-based encoding application 140 generates the target encoded media sequences 180 based on the encoding recipe set 870, the shot sequences 132, and the encoded shot sequences 326 associated with the initial encoding points 242. At step 1320, the sequence-based encoding application 140 transmits the target encoded media sequences 180 to the content delivery network 190 for streaming to endpoint devices. The method 1300 then terminates.

Advantageously, the computational complexity associated with encoding media content using encoding point interpolation is relatively fixed. Accordingly, the number of different encoding points 242 at which each of the shot sequences 132 can be encoded can be increased without increasing the number of generated encoded shot sequences.

Oftentimes a media streaming service provider generates encoded versions of media titles for multiple coder/decoders (codecs). To further decrease the overall amount of time and computational resources required to generate encoded versions of media title for multiple codecs, any number (including none) of the complexity-reducing techniques described previously herein may be implemented in conjunction with codec mapping techniques. Codec mapping techniques are described below in conjunction with FIGS. 14-15.

Mapping Encoding Points Between Codecs

Figure 14:
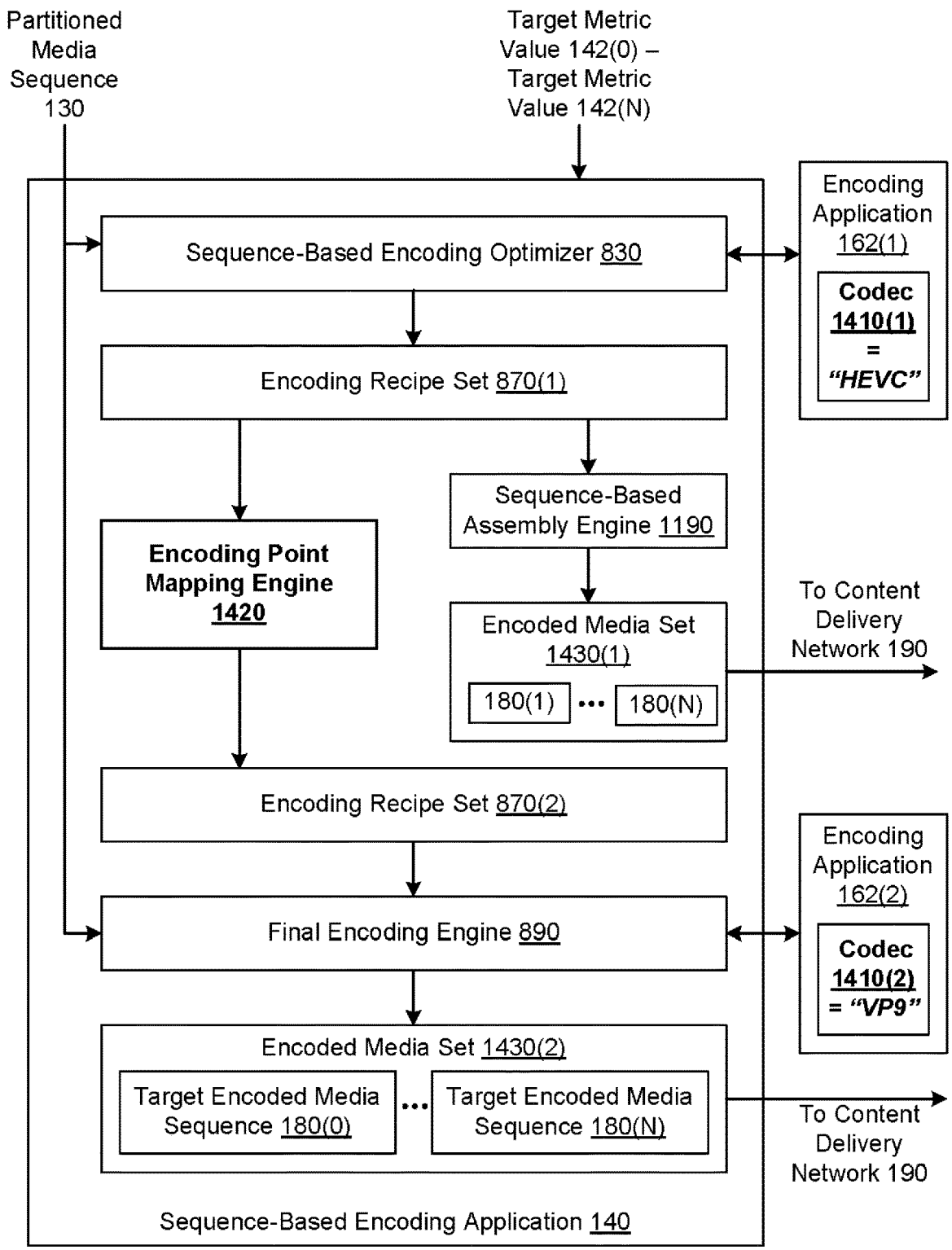
FIG. 14 is a more detailed illustration of the sequence-based encoding application of FIG. 1, according to still other various embodiments of the present invention.

FIG. 14 is a more detailed illustration of the sequence-based encoding application 140 of FIG. 1, according to still other various embodiments of the present invention. The sequence-based encoding application 140 includes, without limitation, the sequence-based optimizer 830, encoding recipe sets 870, the sequence-based assembly engine 1190, encoded media sets 1430, an encoding point mapping engine 1420, and the final encoding engine 890. The sequence-based optimizer 830, the encoding recipe set 870, and the final encoding engine 890 are described in detail previously herein in conjunction with FIGS. 8-9. The sequence-based assembly engine 1190 is described in detail previously herein in conjunction with FIG. 11.

First, the sequence-based encoding application 140 evaluates any number of codecs 1410 to determine the codec 1410(1) that typically executes using the smallest amount of time and computational resources. The codec 1410(1) is also referred to herein as the "source" codec 1410. For explanatory purposes only, FIG. 14 depicts two codecs, the codec 1410(1) is High Efficiency Video Coding (HEVC) and the codec 1410(2) is VP9. The sequence-based encoding application 140 may evaluate the codecs 1410 in any technically feasible fashion.

The sequence-based encoding application 140 configures a first instance of the encoding application 162(1) to perform encoding operations using the codec 1410(1). The sequence-based encoding application 140 may configure the first instance of the encoding application 162(1) to use the codec 1410(1) in any technically feasible fashion. The sequence-based encoding application 140 then configures the sequence-based encoding optimizer 830 to compute the encoding recipe set 870(1) based on the partitioned media sequence 130, the target metric values 142, and the encoding application 162(1).

The sequence-based assembly engine 1190 generates an encoded media set 1430(1) based on the encoding recipe set 870(1). The encoded media set 1430(z) includes, without limitation, the target encoded media sequences 180(1)-180(N) that are associated with the codec 1410(z). In the embodiment depicted, the sequence-based encoding optimizer 830 generates the encoded shot sequences 326 specified in the encoding recipe set 870(1). Accordingly, for each encoding recipe 880(t) included in the encoding recipe set 870(1), the sequence-based assembly engine 1190 aggregates the encoded shot sequences 326 as specified by the encoding recipe 880(*t*) to generate the target encoded media sequence 180(*t*) associated with the codec 1410(1). The sequence-based assembly engine 1190 groups the target encoded media sequences 180(1)-180(N) associated with the codec 1410(1) together as the encoded media set 1430 (1). Subsequently, the sequence-based assembly engine 1190 transmits the encoded media set 1430 to the CDN 190 for distribution to endpoint devices.

The encoding point mapping engine 1420 generates the encoding recipe set 870(2) based on the encoding recipe set 870(1). The encoding point mapping engine 1420 may perform any number and type of translation operations based on the encoding recipe set 870(1) to generate the encoding recipe set 870(2). For instance, in some embodiments, the encoding point mapping engine 1420 performs translation operations using a translation equation that maps the QP value 324 associated with the codec 1410(1) to the comparable QP value 324 associated with the codec 1410(2).

In alternate embodiments, the sequence-based encoding subsystem 126 includes, without limitation, a codec translation equation generator (not shown). The codec translation equation generator generates one or more translation equations that the encoding point mapping engine 1420 uses to generate the encoding recipe set 870(2) based on the encoding recipe set 870(1). The codec translation equation generator may generate the translation equation(s) based on any amount of historical encoding data and in any technically feasible fashion.

For instance, in some embodiments, a first set of historical encoding data includes the QP values 324 that the sequence-based encoding application 140 generated based on a first codec, a library of media titles, and a set of target metric values 142. A second set of historical encoding data includes the QP values 324 that the sequence-based encoding application 140 generated based on a second codec, the library of media titles, and the set of target metric values. The codec translation equation generator performs minimum squared error fitting operations to determine the parameters for a linear or second order relationship between the QP values 324 for the two codecs. The parameterized relationship is a translation equation that maps the QP value 324 for the first codec to the QP value 324 for the second codec. In various embodiments, the codec translation equation generator may produce a variety of translation equations, each associated with a different type of media content (e.g., cartoons, action sequences, etc).

After the encoding point mapping engine 1420 generates the encoding recipe set 870(2), the sequence-based encoding application 140 configures a second instance of the encoding application 162(2) to perform encoding operations using the codec 1410(2). The sequence-based encoding application 140 then configures the final encoding engine 890 to generate the encoded media set 1430(2) based on the partitioned media sequence 130, the encoding recipe set 870(2), and the encoding application 162(2). Note that, as part of generating the encoded media set 1430(2), the final encoding engine 890 generates the encoded shot sequences 386 that are included in the different target encoded media sequences 180. Subsequently, the final encoding engine 890 transmits the encoded media set 1430(2) to the CDN 190 for distribution to endpoint devices.

In alternate embodiments, for each of any number of additional codecs 1410, the sequence-based encoding application 140 may reconfigure the encoding point mapping engine 1420, the encoding application 162, and the final encoding engine 890 to generate the associated encoded media set 1430. More precisely, the sequence-based encoding application 140 may re-configure the encoding point mapping engine 1420 to generate the additional encoding recipe sets 870(*x*) based on the additional codec 1410(*x*) and the encoding recipe set 870(1). The sequence-based encoding application 140 may also reconfigure the encoding application 162(*x*) to encode media content using the codec 1410(*x*). Finally, the sequence-based encoding application 140 may reconfigure the finale encoding engine 890 to generate the encoded media set 1430(*x*) based on the partitioned media sequence 130, the encoding recipe set 870(*x*), and the encoding application 162(*x*).

Figure 15:
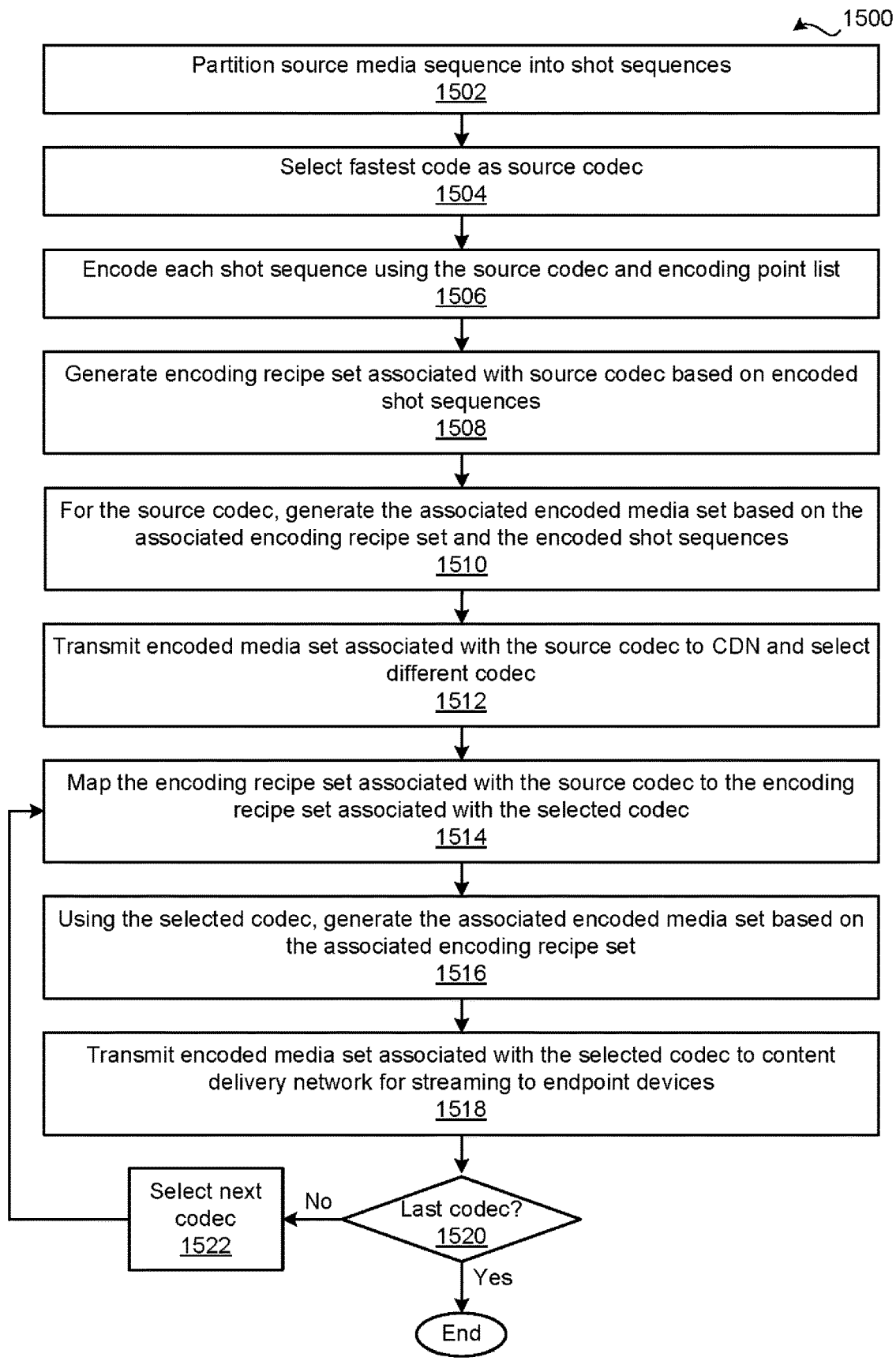
FIG. 15 is a flow diagram of method steps for encoding a source media sequence using multiple codecs, according to various embodiments of the present invention.

FIG. 15 is a flow diagram of method steps for encoding a source media sequence using multiple codecs, according to various embodiments of the present invention. Although the method steps are described with reference to the system of FIGS. 1 and 14, persons skilled in the art will understand that any system configured to implement the method steps, in any order, falls within the scope of the present invention.

As shown, a method 1500 begins a step 1502, where the shot analyzer 128 partitions the source media sequence 122 into the shot sequences 132. At step 1504, the sequence-based encoding application 140 designates the fastest codec 1410 from multiple codecs 1410 as the source codec 1410 (1). At step 1506, the sequence-based encoding optimizer 830 generates the encoded shot sequences 386 based on the shot sequences 132, the encoding point list 210, and the source codec 1410(1). At step 1508, the sequence-based encoding optimizer 830 generates the encoding recipe set 870(1) based on the encoded shot sequences 326 associated with the source codec 1410(1).

At step 1510, the sequence-based assembly engine 1190 generates the encoded media set 1430(1) based on the encoding recipe set 870(1) and the encoded shot sequences 326 associated with the source codec 1410(1). At step 1512, the sequence-based assembly engine 1190 transmits the encoded media set 1430(1) to the content delivery network 190 for streaming to endpoint devices. The sequence-based encoding application 140 then selects the next codec 1410 (2).

At step 1514, the encoding point mapping engine 1420 maps the encoding recipe set 870(1) associated with the source codec 1410(1) to the encoding recipe set 870 associated with the selected codec 1410. At step 1516, the final encoding engine 890 generates the encoded media set 1430 associated with the selected codec 1410 based on the encoding recipe set 870 associated with the selected codec 1410, the shot sequences 132, and the selected codec 1410. At step 1518, the final encoding engine 890 transmits the encoded media set 1430 associated with the selected codec 1410 to the content delivery network 190 for streaming to endpoint devices.

At step 1520, the sequence-based encoding application 140 determines whether the selected codec 1410 is the last codec 1410. If, at step 1520, the sequence-based encoding application 140 determines that the selected codec 1410 is not the last codec 1410, then the method 1500 proceeds to step 1522. At step 1522, the sequence-based encoding application 140 selects the next codec 1410. The method 1500 then returns to step 1514, where the encoding point mapping engine 1420 maps the encoding recipe set 870(1) associated with the source codec 1410(1) to the encoding recipe set 870 associated with the selected codec 1410. If, however, at step 1520, the sequence-based encoding application 140 determines that the selected codec 1410 is not the last codec 1410, then the method 1500 terminates.

Advantageously, using encoding point mapping, multiple encoding recipe sets 870 are generated using the fastest of the codecs 1410. Accordingly, encoding point mapping reduces the time and computational resources used to optimize sequence-based encoding of the source media sequence 122 for multiple codecs.

In sum, the disclosed techniques enable efficient sequence-based encoding of source media sequences. A sequence-based encoding subsystem includes, without limitation, a shot analyzer and a sequence-based encoding application. The shot analyzer partitions a source media sequence into multiple shot sequences. Subsequently, the sequence-based encoding application implements one or more complexity-reducing techniques in any combination to individually encode each of the shot sequences. The complexity-reducing techniques include, without limitation, feature-based encoding, pre-encoding encoding point interpolation, and encoding point mapping.

In some embodiments, the sequence-based encoding application implements feature-based encoding and includes, without limitation, a feature extractor, a shot classifier, a cluster-based encoding optimizer, a cluster encoding recipe set, and a cluster-based assembly engine. For each shot sequence, the feature extractor generates an associated feature vector. The shot classifier partitions the shot sequences into multiple clusters based on the feature vectors. In general, if two shot sequences have relatively similar features, then the shot classifier assigns the shot sequences to the same cluster. By contrast, if two shot sequences have relatively dissimilar features, then the shot classifier assigns the shot sequences to different clusters. For each cluster, the shot classifier selects the feature vector that lies closest to the centroid of the cluster and designates the shot sequence associated with the selected feature vector as the representative shot sequence for the cluster. For each cluster, the shot classifier sums the number of frames included in each the shot sequences assigned to the cluster to compute an associated frame count.

For each cluster, the cluster-based encoding optimizer encodes the representative shot sequence using multiple encoding points to generate encoded shot sequences associated with the cluster. The cluster-based encoding optimizer then performs optimization operations based on the encoded shot sequences and the associated frame counts to generate a set of cluster encoding recipes that minimize the overall bitrate for different overall distortion levels. Each cluster encoding recipe specifies how to encode the shot sequences to generate the target encoded media sequence that is optimized for a different target metric value. More precisely, a given cluster encoding recipe specifies a different optimized encoding point for each cluster.

For each cluster, the cluster-based assembly engine encodes each of the associated non-representative shot sequences using the associated encoding points specified in the cluster encoding recipes to generate additional encoded shot sequences. The feature-based assembly engine then generates target encoded media sequences based on the cluster encoding recipes and the encoded shot sequences. Finally, the sequence-based encoding application transmits the target encoded media sequences to a content delivery network for distribution to endpoint devices.

At least one technological improvement of feature-based encoding relative to prior art is that encoding each shot sequence using an encoding point that is optimized based on features of the shot sequence reduces the encoding inefficiencies typically associated with monolithic encoding techniques. Such encoding inefficiencies not only needlessly waste computational and storage resources, these types of inefficiencies also unnecessarily increase the bandwidth required to stream encoded versions of media titles to endpoint devices. Further, by determining the optimized encoding points based on a representative subset of the shot sequences, feature-based encoding reduces the time and amount of computational resources required to encode a media title for streaming relative to prior art approaches.

In some embodiments, the sequence-based encoding application implements pre-encoding and includes, without limitation, a configuration factor, a compensation engine, a sequence-based encoding optimizer, an encoding recipe set, and a final encoding engine. The configuration factor represents a degradation in the media metric attributable to encoding media content using a relative fast encoding process instead of a relatively slow encoding process. The compensation engine generates compensated target metric values based on the target metric values and the configuration factor. Subsequently, for each permutation of the shot sequences and the encoding points, the sequence-based encoding application generates a different pre-encoded shot sequence using the relatively fast encoding process.

The sequence-based encoding application then performs optimization operations based on the pre-encoded shot sequences to generate a first encoding recipe set that includes one or more encoding recipes. Each encoding recipe is associated with a different target metric value and specifies a list of optimized encoding points, where each optimized encoding point is associated with a different shot sequence. The final encoding engine generates target encoded media sequences based on the shot sequences, a relatively fast encoding process, and the encoding recipes included in the encoding recipe set. Finally, the sequence-based encoding application transmits the target encoded media sequences to a content delivery network for distribution to endpoint devices.

At least one technological improvement of pre-encoding relative to prior art approaches is that a relatively fast encoding process is used to optimize the encoding points used in conjunction with a relatively slow encoding process to encode the individual shot sequences. Re-encoding each shot sequence using an encoding point that is optimized for the shot sequence reduces the encoding inefficiencies typically associated with monolithic encoding techniques. Further, by optimizing the encoding points using a relatively fast encoding process, pre-encoding reduce the time and amount of computational resources required to encode the media title for streaming relative to prior art approaches.

In some embodiments, the sequence-based encoding application implements encoding point interpolation and includes, without limitation, an interpolation-based encoding optimizer, the encoding recipe set, and a sequence-based assembly engine. The interpolation-based encoding optimizer designates a portion of the encoding points as "initial" encoding points and the remaining encoding points as "estimated" encoding points. For each permutation of the initial encoding points and the shot sequences, the interpolation-based encoding optimizer generates a different encoded shot sequence. For each of the encoded shot sequences, the interpolation-based encoding optimizer computes a bitrate/distortion level pair. For each permutation of resolution and shot sequence, the interpolation-based encoding optimizer fits the bitrate/distortion level pairs for the associated encoded shot sequences to a cubic spline polynomial to generate an associated distortion curve.

Subsequently, the interpolation-based encoding optimizer performs interpolation operations to estimate the bitrate/distortion level pairs for the estimated encoding points based on the distortion curves. The interpolation-based encoding optimizer then optimizes the bitrate for different distortion levels based on the bitrate/distortion level pairs for all of the encoding points to generate the encoding recipe set. The sequence-based assembly engine generates target encoded media sequences based on the shot sequences, the encoded shot sequences, and the encoding recipe set. Finally, the sequence-based encoding application transmits the target encoded media sequences to a content delivery network for distribution to endpoint devices.

At least one technological improvement of interpolation-based encoding relative to prior art approaches is that the number of different encoding points at which each shot sequence included in a given media title can be encoded is increased without increasing the time required to encode shot sequences. In particular, if the number of initial encoding points does not change, then the number of estimated encoding points can be increased without increasing the time required to encode shot sequences. Because each of the encoding points included in the encoding recipe set can be either an initial or an estimated encoding point, the reduction in encoding inefficiencies typically associated with monolithic encoding techniques correlates to the total number of encoding points.

In some embodiments, the sequence-based encoding application implements encoding point mapping and includes, without limitation, the sequence-based encoding optimizer, the sequence-based assembly engine, multiple encoding recipe sets, an encoding point mapping engine, and a final encoding engine. The sequence-based encoding application determines a source codec from multiple target codecs. The source code is the codec that typically executes using the smallest amount of time and computational resources. The sequence-based encoding application then configures the sequence-based encoding optimizer to generate a source encoding recipe set based on the source codec. The sequence-based assembly engine generates a set of target encoded media sequences based on the source encoding recipe set and the source codec. The sequence-based assembly engine transmits the set of target encoded media sequences to a content delivery network for distribution to endpoint devices.

Subsequently, the encoding point mapping engine selects a different codec included in the target codecs and configures the encoding point mapping engine to map the source encoding recipe set to an encoding recipe set associated with the selected codec. The encoding point mapping engine may perform any number and type of mapping operations in any technically feasible fashion. For instance, in some embodiments, the encoding point mapping engine implements a linear mapping from an encoding point associated with the source codec to an encoding point associated with a different codec. The sequence-based encoding application then configures the final encoding engine to perform encoding operations using the selected codec and the encoding recipe set associated with the selected codec to generate a new set of target encoded media sequences. The final encoding engine transmits the new set of target encoded media sequences to a content delivery network for distribution to endpoint devices. Using this mapping and re-encoding process, the sequence-based encoding application generates a new of target encoded media sequences for each additional target codec.

At least one technological improvement of encoding point mapping relative to prior art approaches is that generating an optimized encoded media sequence for a "target" codec based on encoding points associated with a source codec reduces the encoding inefficiencies typically associated with monolithic encoding techniques. Namely, the encoding point for each shot sequence is individually optimized based on both the source sequence and the target codec. Further, mapping the source encoding points to encoding points optimized for the target codec reduces the number of encoding operations performed using the target codec to optimize the target encoded media sequence relative to prior art approaches. Consequently, the time and computational resources required to perform sequence-based encoding of a media sequence using multiple codecs are optimized relative to prior art approaches.

1. In some embodiments, a computer-implemented method comprises partitioning a plurality of shot sequences associated with a media title into a plurality of clusters based on at least one feature that characterizes at least one of media content and encoded media content associated with the media title; encoding a first shot sequence using a first encoding point to generate a first encoded shot sequence, wherein the first encoding point and the first shot sequence are associated with a first cluster included in the plurality of clusters; encoding a second shot sequence using a second encoding point to generate a second encoded shot sequence, wherein the second encoding point and the second shot sequence are associated with a second cluster included in the plurality of clusters; and generating a first encoded media sequence based on the first encoded shot sequence and the second encoded shot sequence, wherein at least a portion of the first encoded media sequence is subsequently streamed to an endpoint device during playback of the media title.

2. The computer-implemented method of clause 1, further comprising, prior to encoding the first shot sequence, encoding a third shot sequence associated with the first cluster using a plurality of encoding point to generate a plurality of encoded shot sequences; and performing one or more optimization operations based on the plurality of encoded shot sequences and a first target value for a video metric to determine the first encoding point.

3. The computer-implemented method of clauses 1 or 2, wherein partitioning the plurality of shot sequences comprises for each shot sequence included in the plurality of shot sequences, extracting a different feature vector included in a plurality of feature vectors, wherein each feature vector includes a different set of feature values associated with the at least one feature; and performing one or more clustering operations on the plurality of shot sequences based on the plurality of feature vectors to generate the plurality of clusters.

4. The computer-implemented method of any of clauses 1-3, wherein the one or more clustering operations are associated with a K-Means algorithm or a trained neural network.

5. The computer-implemented method of any of clauses 1-4, further comprising, prior to encoding the first shot sequence, determining a third shot sequence from the plurality of shot sequences based on a distance of a first feature vector from a centroid associated with the first cluster, wherein the first feature vector is associated with both the at least one feature and the third shot sequence; and performing one or more optimization operations based on the third shot sequence and a first target value for a video metric to determine the first encoding point.

6. The computer-implemented method of any of clauses 1-5, wherein the media title comprises at least one of video content and audio content.

7. The computer-implemented method of any of clauses 1-6, further comprising, prior to encoding the first shot sequence, encoding a third shot sequence associated with the first cluster using a plurality of encoding points to generate a plurality of encoded shot sequences; generating a set of shot encode points based on the plurality of encoded shot sequences; performing one or more convex hull operations across the set of shot encode points to generate a first convex hull; and performing one or more optimization operations based on the first convex hull, a second convex hull that is associated with the second cluster, and a target value for a media metric to determine the first encoding point.

8. The computer-implemented method of any of clauses 1-7, wherein the at least one feature comprises at least one of a brightness, a colorfulness, a texture detail, a degree of motion uniformity, and a number of edges.

9. The computer-readable storage medium of any of clauses 1-8, wherein the first encoding point is associated with a target value for a bitrate, a visual quality metric, or a distortion metric.

10. In some embodiments, a computer-readable storage medium includes instructions that, when executed by a processor, configure the processor to perform the steps of generating a plurality of subsequences based on a source sequence associated with a media title; partitioning the plurality of subsequences into a plurality of clusters based on at least one feature that characterizes at least one of media content and encoded media content associated with the media title; encoding a first subsequence using a first encoding point to generate a first encoded subsequence, wherein the first encoding point and the first subsequence are associated with a first cluster included in the plurality of clusters; encoding a second subsequence using a second encoding point to generate a second encoded subsequence, wherein the second encoding point and the second subsequence are associated with a second cluster included in the plurality of clusters; and generating a first encoded media sequence based on the first encoded subsequence and the second encoded subsequence, wherein at least a portion of the first encoded media sequence is subsequently streamed to an endpoint device during playback of the media title.

11. The non-transitory computer-readable medium of clause 10, further comprising, prior to encoding the first subsequence, encoding a third subsequence associated with the first cluster using a plurality of encoding point to generate a plurality of encoded subsequences; and performing one or more optimization operations based on the plurality of encoded subsequences and a first target value for a video metric to determine the first encoding point.

12. The non-transitory computer-readable medium of clauses 10 or 11, wherein partitioning the plurality of subsequences comprises for each subsequence included in the plurality of subsequences, extracting a different feature vector included in a plurality of feature vectors, wherein each feature vector includes a different set of feature values associated with the at least one feature; and performing one or more clustering operations on the plurality of subsequences based on the plurality of feature vectors to generate the plurality of clusters.

13. The non-transitory computer-readable medium of any of clauses 10-12, wherein the one or more clustering operations are associated with a K-Means algorithm or a trained neural network.

14. The non-transitory computer-readable medium of any of clauses 10-13, further comprising, prior to encoding the first subsequence, determining a third subsequence from the plurality of subsequences based on a distance of a first feature vector from a centroid associated with the first cluster, wherein the first feature vector is associated with both the at least one feature and the third subsequence; and performing one or more optimization operations based on the third subsequence and a first target value for a video metric to determine the first encoding point.

15. The non-transitory computer-readable medium of any of clauses 10-14, further comprising, prior to encoding the first subsequence encoding a third subsequence associated with the first cluster using a plurality of encoding points to generate a plurality of encoded subsequences; computing a total number of frames associated with the first cluster; and performing one or more optimization operations based on the plurality of encoded subsequences, the total number of frames, and a target value for a media metric to determine the first encoding point.

16. The non-transitory computer-readable medium of any of clauses 10-15, further comprising, prior to encoding the second subsequence, performing one or more optimization operations based on a first convex hull, a second convex hull, and a target value for a media metric to determine the second encoding point.

17. The non-transitory computer-readable medium of any of clauses 10-16, wherein the at least one feature comprises at least one of a brightness, a colorfulness, a texture detail, a degree of motion uniformity, and a number of edges.

18. The non-transitory computer-readable medium of any of clauses 10-17, wherein the first encoding point specifies a first resolution and the second encoding point specifies a second resolution that is not equal to the first resolution.

19. The non-transitory computer-readable medium of any of clauses 10-18, wherein the first encoding point is associated with a first target value for a media metric and further comprising encoding the first subsequence using a third encoding point to generate a third encoded subsequence, wherein the third encoding point is associated with both the first cluster and a second target value for the media metric; and generating a second encoded media sequence based on the third encoded subsequence and the second encoded subsequence, wherein at least a portion of the second encoded media sequence is subsequently streamed to the endpoint device during playback of the media title.

20. In some embodiments, a system comprises a memory storing instructions; and a processor that is coupled to the memory and, when executing the instructions, is configured to partition a plurality of shot sequences associated with a media title into a plurality of clusters based on at least one feature that characterizes at least one of media content and encoded media content associated with the media title; for each shot sequence associated with a first cluster included in the plurality of clusters, perform one or more encoding operations based on a first encoding point to generate a different encoded shot sequence included in a first plurality of encoded shot sequences; for each shot sequence associated with a second cluster included in the plurality of clusters, perform one or more encoding operations based on a second encoding point to generate a different encoded shot sequence included in a second plurality of encoded shot sequences; and generating a first encoded media sequence based on the first plurality of encoded shot sequences and the second plurality of encoded shot sequences, wherein at least a portion of the first encoded media sequence is subsequently streamed to an endpoint device during playback of the media title.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method, comprising:
    partitioning a media title into a plurality of shot sequences;
    partitioning the plurality of shot sequences into a plurality of clusters of shot sequences based on at least one feature that characterizes at least one of media content or encoded media content associated with the media title;
    encoding a first shot sequence using a first encoding point to generate a first encoded shot sequence, wherein the first encoding point and the first shot sequence are associated with a first cluster of shot sequences included in the plurality of clusters of shot sequences; and
    encoding a second shot sequence using a second encoding point to generate a second encoded shot sequence, wherein the second encoding point and the second shot sequence are associated with a second cluster of shot sequences included in the plurality of clusters of shot sequences,
    wherein at least a portion of at least the first encoded shot sequence or the second encoded shot sequence is subsequently streamed to an endpoint device during playback of the media title.

2. The computer-implemented method of claim 1, further comprising, prior to encoding the first shot sequence:
    encoding a third shot sequence associated with the first cluster of shot sequences using a plurality of encoding point to generate a plurality of encoded shot sequences; and
    performing one or more optimization operations based on the plurality of encoded shot sequences and a first target value for a video metric to determine the first encoding point.

3. The computer-implemented method of claim 1, wherein partitioning the plurality of shot sequences comprises:
    for each shot sequence included in the plurality of shot sequences, extracting a different feature vector included in a plurality of feature vectors, wherein each feature vector includes a different set of feature values associated with the at least one feature; and
    performing one or more clustering operations on the plurality of shot sequences based on the plurality of feature vectors to generate the plurality of clusters of shot sequences.

4. The computer-implemented method of claim 3, wherein the one or more clustering operations are associated with a K-Means algorithm or a trained neural network.

5. The computer-implemented method of claim 1, further comprising, prior to encoding the first shot sequence:
   determining a third shot sequence from the plurality of shot sequences based on a distance of a first feature vector from a centroid associated with the first cluster of shot sequences, wherein the first feature vector is associated with both the at least one feature and the third shot sequence; and
   performing one or more optimization operations based on the third shot sequence and a first target value for a video metric to determine the first encoding point.

6. The computer-implemented method of claim 1, wherein the media title comprises at least one of video content or audio content.

7. The computer-implemented method of claim 1, further comprising, prior to encoding the first shot sequence:
   encoding a third shot sequence associated with the first cluster of shot sequences using a plurality of encoding points to generate a plurality of encoded shot sequences;
   generating a set of shot encode points based on the plurality of encoded shot sequences;
   performing one or more convex hull operations across the set of shot encode points to generate a first convex hull; and
   performing one or more optimization operations based on the first convex hull, a second convex hull that is associated with the second cluster of shot sequences, and a target value for a media metric to determine the first encoding point.

8. The computer-implemented method of claim 1, wherein the at least one feature comprises at least one of a brightness, a colorfulness, a texture detail, a degree of motion uniformity, or a number of edges.

9. The computer-implemented method of claim 1, wherein the first encoding point is associated with a target value for a bitrate, a visual quality metric, or a distortion metric.

10. A non-transitory computer-readable medium storing program instructions that, when executed by a processor, configures the processor to perform the steps of:
   generating a plurality of subsequences based on a source sequence associated with a media title, when each subsequence included in the plurality of subsequences comprises a shot sequence;
   partitioning the plurality of subsequences into a plurality of clusters of shot sequences based on at least one feature that characterizes at least one of media content or encoded media content associated with the media title;
   encoding a first subsequence using a first encoding point to generate a first encoded subsequence, wherein the first encoding point and the first subsequence are associated with a first cluster of shot sequences included in the plurality of clusters of shot sequences; and
   encoding a second subsequence using a second encoding point to generate a second encoded subsequence, wherein the second encoding point and the second subsequence are associated with a second cluster of shot sequences included in the plurality of clusters,
   wherein at least a portion of at least one of the first encoded shot sequence or the second encoded shot sequence is subsequently streamed to an endpoint device during playback of the media title.

11. The non-transitory computer-readable medium of claim 10, the steps further comprising, prior to encoding the first subsequence:
   encoding a third subsequence associated with the first cluster of shot sequences using a plurality of encoding point to generate a plurality of encoded subsequences; and
   performing one or more optimization operations based on the plurality of encoded subsequences and a first target value for a video metric to determine the first encoding point.

12. The non-transitory computer-readable medium of claim 10, wherein partitioning the plurality of subsequences comprises:
   for each subsequence included in the plurality of subsequences, extracting a different feature vector included in a plurality of feature vectors, wherein each feature vector includes a different set of feature values associated with the at least one feature; and
   performing one or more clustering operations on the plurality of subsequences based on the plurality of feature vectors to generate the plurality of clusters of shot sequences.

13. The non-transitory computer-readable medium of claim 12, wherein the one or more clustering operations are associated with a K-Means algorithm or a trained neural network.

14. The non-transitory computer-readable medium of claim 10, further comprising, prior to encoding the first subsequence:
   determining a third subsequence from the plurality of subsequences based on a distance of a first feature vector from a centroid associated with the first cluster of shot sequences, wherein the first feature vector is associated with both the at least one feature and the third subsequence; and
   performing one or more optimization operations based on the third subsequence and a first target value for a video metric to determine the first encoding point.

15. The non-transitory computer-readable medium of claim 10, the steps further comprising, prior to encoding the first subsequence:
   encoding a third subsequence associated with the first cluster of shot sequences using a plurality of encoding points to generate a plurality of encoded subsequences;
   computing a total number of frames associated with the first cluster of shot sequences; and
   performing one or more optimization operations based on the plurality of encoded subsequences, the total number of frames, and a target value for a media metric to determine the first encoding point.

16. The non-transitory computer-readable medium of claim 10, the steps further comprising, prior to encoding the second subsequence, performing one or more optimization operations based on a first convex hull, a second convex hull, and a target value for a media metric to determine the second encoding point.

17. The non-transitory computer-readable medium of claim 10, wherein the at least one feature comprises at least one of a brightness, a colorfulness, a texture detail, a degree of motion uniformity, or a number of edges.

18. The non-transitory computer-readable medium of claim 10, wherein the first encoding point specifies a first resolution and the second encoding point specifies a second resolution that is not equal to the first resolution.

19. The non-transitory computer-readable medium of claim 10, wherein the first encoding point is associated with a first target value for a media metric, and the steps further comprise:

encoding the first subsequence using a third encoding point to generate a third encoded subsequence, wherein the third encoding point is associated with both the first cluster of shot sequences and a second target value for the media metric; and generating a second encoded media sequence based on the third encoded subsequence and the second encoded subsequence, wherein at least a portion of the second encoded media sequence is subsequently streamed to the endpoint device during playback of the media title.

20. A system, comprising:

a memory storing instructions; and a processor that is coupled to the memory and, when executing the instructions, is configured to:

partition a media title into a plurality of shot sequences, partition a plurality of shot sequences associated with a media title into a plurality of clusters of shot sequences based on at least one feature that characterizes at least one of media content or encoded media content associated with the media title, for each shot sequence associated with a first cluster of shot sequences included in the plurality of clusters of shot sequences, perform one or more encoding operations based on a first encoding point to generate a different encoded shot sequence included in a first plurality of encoded shot sequences, for each shot sequence associated with a second cluster of shot sequences included in the plurality of clusters of shot sequences, perform one or more encoding operations based on a second encoding point to generate a different encoded shot sequence included in a second plurality of encoded shot sequences, wherein at least a portion of at least one of first encoded shot sequence or the second encoded shot sequence is subsequently streamed to an endpoint device during playback of the media title.

* * * * *

UNITED STATES PATENT AND TRADEMARK OFFICE
CERTIFICATE OF CORRECTION

| | |
|---|---|
| PATENT NO. | : 11,153,585 B2 |
| APPLICATION NO. | : 16/054621 |
| DATED | : October 19, 2021 |
| INVENTOR(S) | : Ioannis Katsavounidis, Anne Aaron and Jan De Cock |

It is certified that error appears in the above-identified patent and that said Letters Patent is hereby corrected as shown below:

On the Title Page

Page 2, Column 1, (56) References Cited:
Please delete "WO 32/32141 A2 4/2002" and insert --WO 02/32141 A2 4/2002--.

Signed and Sealed this
Eleventh Day of January, 2022

Drew Hirshfeld
*Performing the Functions and Duties of the*
*Under Secretary of Commerce for Intellectual Property and*
*Director of the United States Patent and Trademark Office*